United States Patent
Romeo et al.

(10) Patent No.: US 12,006,397 B2
(45) Date of Patent: *Jun. 11, 2024

(54) COMPOSITION COMPRISING A POLYESTER-POLYETHER POLYMER, A TRANSITION METAL CATALYST, AND AN ACTIVE MATERIAL

(71) Applicant: CLARIANT PLASTICS & COATINGS LTD, Muttenz (CH)

(72) Inventors: Bernardo Romeo, Paris (FR); Sarah Boukobza, Paris (FR)

(73) Assignee: AVIENT SWITZERLAND GMBH, Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/259,604

(22) PCT Filed: Jul. 8, 2019

(86) PCT No.: PCT/EP2019/068240
§ 371 (c)(1),
(2) Date: Feb. 1, 2021

(87) PCT Pub. No.: WO2020/011704
PCT Pub. Date: Jan. 16, 2020

(65) Prior Publication Data
US 2021/0317262 A1  Oct. 14, 2021

(30) Foreign Application Priority Data

Jul. 13, 2018  (EP) ..................... 18183387

(51) Int. Cl.
| | | |
|---|---|---|
| *C08G 63/672* | (2006.01) | |
| *B01J 31/12* | (2006.01) | |
| *C08G 63/20* | (2006.01) | |
| *C08L 67/02* | (2006.01) | |

(52) U.S. Cl.
CPC ............ *C08G 63/672* (2013.01); *B01J 31/12* (2013.01); *C08G 63/20* (2013.01); *C08L 67/025* (2013.01)

(58) Field of Classification Search
CPC .... C08G 63/20; C08G 63/672; C08K 5/0091; C08K 5/098; C08L 67/02; C08L 67/025; B01J 31/12
See application file for complete search history.

(56) References Cited

U.S. PATENT DOCUMENTS

| | | | | |
|---|---|---|---|---|
| 4,407,897 A | * | 10/1983 | Farrell ...................... | B32B 7/12 428/688 |
| 5,789,044 A | * | 8/1998 | Ram ........................ | G03C 3/00 242/600 |
| 6,083,585 A | | 7/2000 | Cahill et al. | |
| 6,455,620 B1 | | 9/2002 | Cyr et al. | |
| 8,647,728 B2 | | 2/2014 | Drbohlav, III et al. | |
| 11,345,809 B2 | | 5/2022 | Akkapeddi et al. | |
| 11,447,627 B2 | * | 9/2022 | Sahl ....................... | C08L 67/025 |
| 2003/0235664 A1 | * | 12/2003 | Merical ................... | B32B 27/18 428/35.7 |
| 2004/0106721 A1 | | 6/2004 | Soerens | |
| 2006/0269708 A1 | | 11/2006 | Merical et al. | |
| 2009/0312500 A1 | * | 12/2009 | Awojulu ................. | C08L 71/00 525/403 |
| 2011/0008554 A1 | * | 1/2011 | Chen ....................... | C08L 67/02 428/36.9 |
| 2015/0240052 A1 | * | 8/2015 | Fava ..................... | C08K 5/0091 524/103 |
| 2016/0229994 A1 | * | 8/2016 | Lavallée ................. | C08L 27/12 |
| 2016/0243801 A1 | * | 8/2016 | Okuyama ............... | C08J 7/043 |
| 2020/0017679 A1 | * | 1/2020 | Sahl ....................... | C08G 63/20 |

FOREIGN PATENT DOCUMENTS

| | | |
|---|---|---|
| CA | 3050058 A1 | 8/2018 |
| CN | 102575088 A | 7/2012 |
| CN | 107075235 A | 8/2017 |
| EP | 0268920 * | 6/1988 |
| EP | 0881193 B1 | 8/2001 |

(Continued)

OTHER PUBLICATIONS

Simon Angelo Cichello "Oxygen absorbers in food preservation: a review", J Food Sci Technol (Apr. 2015) 52(4):1889-1895 (Year: 2015).*
Examination Report dated Aug. 6, 2021, issued in corresponding Australian Patent Application No. 2019300235.
Office Action dated Mar. 18, 2022, issued in corresponding Canadia Patent Application No. 3106129.
Translation of First Office Action dated Aug. 12, 2022, issued in corresponding Chinese Patent Application No. 201980058198.X.
Examination Report dated Aug. 24, 2022, issued in corresponding Indian Patent Application No. 202117005624.

(Continued)

*Primary Examiner* — Frances Tischler
*Assistant Examiner* — Gennadiy Mesh
(74) *Attorney, Agent, or Firm* — Morgan, Lewis & Bockius LLP

(57) ABSTRACT

Polymer compositions with an end-capped polyether-polyester copolymer, a transition metal catalyst and an active material that acts on, interacts or reacts with moisture. The polyether-polyester copolymer has (i) polyether segments where at least one polyether segment contains at least one polytetramethylene oxide segment; (ii) polyester segments; (iii) bridging elements of the structure —CO—R2-CO—, where R2 represents an optionally substituted bivalent hydrocarbon residue consisting of 1 to 100 carbon atoms; and (iv) one or two end-caps $R_1\text{-O—}(C_2\text{-}C_4\text{-O—})_e\text{-}^*$, where R1 is an optionally substituted hydrocarbon residue and e is an integer of from 0 to 1000. The polymer composition is capable of scavenging oxygen and can be used in compositions and articles to remove oxygen or to function as an active oxygen barrier.

20 Claims, 4 Drawing Sheets

(56) References Cited

FOREIGN PATENT DOCUMENTS

| EP | 2886601 A1 | 6/2015 |
| JP | H03-229724 A | 10/1991 |
| JP | 2003-064250 A | 3/2003 |
| JP | 2001233950 * | 8/2008 |
| JP | 2010-235647 A | 10/2010 |
| JP | 5292833 * | 9/2013 |
| JP | 2018-501327 A | 1/2018 |
| RU | 2534083 C2 | 11/2014 |
| WO | 98/12127 A1 | 3/1998 |
| WO | 98/12244 A1 | 3/1998 |
| WO | 01/10947 A1 | 2/2001 |
| WO | 2005/059019 A1 | 6/2005 |
| WO | 2005/059020 A1 | 6/2005 |
| WO | 2009/032560 A1 | 3/2009 |
| WO | 2010/096459 A2 | 8/2010 |
| WO | 2016/073300 A1 | 5/2016 |
| WO | 2016/204733 A1 | 12/2016 |

OTHER PUBLICATIONS

Substantive Examination Report dated Aug. 2, 2022, issued in corresponding Indonesia Patent Application No. P00202100231.
Translation of Office Action dated Feb. 24, 2022, issued in corresponding Japanese Patent Application No. 2021-500890.
Office Action dated Jun. 6, 2022, issued in corresponding Russian Patent Application No. 2021103524.
Search Report (with partial translation) dated Aug. 23, 2021, issued in corresponding Russian Patent Application No. 2021103524.
International Search Report and Written Opinion dated Sep. 4, 2019, issued in corresponding International Patent Application No. PCT/EP2019/068240.
Notice of Allowance dated Mar. 15, 2023, issued in corresponding Korean Patent Application No. 10-2021-7003729.

* cited by examiner

COMPOSITION COMPRISING A POLYESTER-POLYETHER POLYMER, A TRANSITION METAL CATALYST, AND AN ACTIVE MATERIAL

The present invention relates to a polymer composition comprising an end-capped polyether-polyester copolymer, a transition metal catalyst and an active material that acts on, interacts or reacts with moisture, which polymer composition is capable of scavenging oxygen and its use in compositions and articles capable of removing oxygen or functioning as an active oxygen barrier.

Thermoplastic resins such as PET (polyethylene terephthalate) have been widely used to produce several types of packaging and storage containers. PET is mostly involved in the beverage industry because it is as transparent as glass but much lighter; it is also fracture resistant; completely recyclable and has a good flexibility of color and a variety of PET bottle designs are also made possible. The biggest disadvantage of PET is its permeability to gases and in this case specifically its permeability to oxygen.

It is well known that packaging for electronics, personal care, household, industrial, food and beverage products require high barrier properties to oxygen to preserve the freshness and quality of the package contents. Especially, oxygen-sensitive pharmaceutical, medical, and food products require packaging materials with high barrier properties or the ability to block oxygen ingress and/or remove oxygen trapped inside to avoid oxidation of products and extend shelf life of goods.

To address these limitations and improve shelf life of oxygen sensitive products a number of strategies have been used.

The packaging industry has developed, for example, multilayer structures comprising mixed polymer layers. These laminated packaging containers offer improved barrier properties approaching, but not comparable to, those of glass and steel while sacrificing many of the recycling benefits associated with single layer containers such as PET, polyethylene naphthalate (PEN) or polyolefin bottles. Maintaining the proper balance of recyclability and barrier properties is most critical in packaging applications.

The use of multilayer bottles that contain an inner, sometimes sandwiched, layer of a higher barrier polymer material compared to the outer polymer layers is commonplace. Typically the center layer is a high barrier polymer that slows the permeability of oxygen through the container wall. Examples of such passive high barrier polymers include ethylene-vinyl alcohol (EVOH) and polyamides, preferably a partially aromatic polyamide containing meta-xylylene groups, such as poly (m-xylylene adipamide), MXD6. A common construction for such multilayer structures would comprise inner and outer layers of PET with a center layer of a polyamide, or inner and outer layers of polyolefins with a center layer of ethylene-vinyl alcohol (EVOH) polymer.

A different strategy that can also be combined with the use of passive barriers is the use of an active oxygen scavenger to reduce or remove the oxygen inside of the package. The method of providing oxygen barrier properties where a substance consumes or reacts with the oxygen is known as a (re)active oxygen barrier and differs from the passive oxygen barriers which attempt to hermetically seal a product away from oxygen via the passive approach. Several oxygen scavenging systems are known in the art. Among others, oxygen-scavenging compositions comprising an oxidizable substituted or unsubstituted ethylenically unsaturated hydrocarbon and a transition metal catalyst are well-known viable solutions.

Containers, such as sachets, filled with oxygen scavenging compositions are well-known examples of applications of such materials. However, these applications are generally limited to solid substances and solid foods and, a special care is needed to avoid ingestion.

To solve this issue, oxygen scavengers have been also incorporated into a polymer resin that forms at least one layer of the container and small amounts of transition metal salts can be added to catalyse and actively promote the oxidation of the scavengers, enhancing the oxygen barrier characteristics of the package.

This method affords the opportunity to eliminate or reduce oxygen coming from the outside but also unwanted oxygen from the package cavity that may have been inadvertently introduced during packaging or filling.

Modified polyesters have been also widely used as oxygen scavengers. Different modifications of the esters have been found to be active as oxygen scavengers. U.S. Pat. No. 6,083,585A, WO 98/12127 and WO 98/12244 disclose oxygen scavenging polyester compositions wherein the oxygen scavenger component is polybutadiene.

Other modifications consist on the introduction of ether groups by using poly (alkylene oxide)s, for example.

U.S. Pat. No. 6,455,620 discloses poly (alkylene glycol)s that act as oxygen scavengers blended with different thermoplastic polymers.

WO 01/10947 discloses oxygen scavenging compositions comprising an oxidation catalyst and at least one polyether selected from the group consisting of poly(alkylene glycol)s, copolymers of poly(alkylene glycol)s and blends containing poly(alkylene glycol)s suitable for incorporating into articles containing oxygen-sensitive products. Similar compositions are known from EP 2 886 601 and WO 2010/096459.

WO 2009/032560A1 discloses oxygen scavenging compositions comprising an oxidation catalyst and a copolyester ether comprising a polyether segments comprising poly (tetramethylene-co-alkylene ether) having low haze level.

WO 2005/059019 A1 and WO 2005/059020 A2 disclose compositions comprising a copolymer comprising polypropylene oxide segments and a polymer with improved active oxygen barrier properties compared to previously known compositions.

The aforementioned oxygen scavenging systems aim at reducing the oxygen level in the package to a degree as low as possible. This is, however, not always desirable. Not all products have the same needs regarding a suitable atmosphere for extended shelf life. In case of wine, fruits and vegetables the creation of a suitable atmosphere containing a limited oxygen level is desirable to allow the development of a pleasant flavor. In case of meat and fish, a certain low oxygen level in the atmosphere is necessary to avoid growth of certain pathogen anaerobic bacteria, like *Clostridium botulinum*.

To keep a certain low oxygen level in the package, it is necessary to match the ingress of oxygen into the package with the rate of oxygen consumption by the oxygen scavenging composition. This could potentially be achieved by lowering the content of oxygen scavenging composition in the package. However, this would come at the expense of the overall oxygen scavenging capacity of the package, thereby reducing the shelf life of the contained product article.

It is therefore desirable to provide an oxygen scavenging system, which is able to finely tune the rate of oxygen scavenging reaction to a desired reduced level and to maintain this level over the intended shelf-life of the product, thus providing high scavenging capacity.

It was found surprisingly that certain polyether-polyester copolymers as hereinafter described can effectively be used to effect and control oxygen scavenging in a thermoplastic material.

SUMMARY OF THE INVENTION

These and other objectives are solved by the object of the present invention.

In a first aspect, the present invention concerns a polymer composition as defined in the claims.

In a second aspect, the present invention concerns an active oxygen barrier composition comprising the polymer composition, as defined in the claims.

In a third aspect, the present invention concerns plastic material comprising the polymer composition of the first aspect of the invention, as defined in the claims.

In a fourth aspect, the present invention concerns an article of manufacture comprising the polymer composition of the first aspect of the invention, as defined in the claims.

In a fifth aspect, the present invention concerns a medical or pharmaceutical packaging element comprising the polymer composition of the first aspect of the invention or the article of manufacture of the fourth aspect of the invention, as defined in the claims.

In a sixth aspect, the present invention concerns use of the polymer composition of the first aspect of the invention, as defined in the claims.

DETAILED DESCRIPTION

Figure 1A:
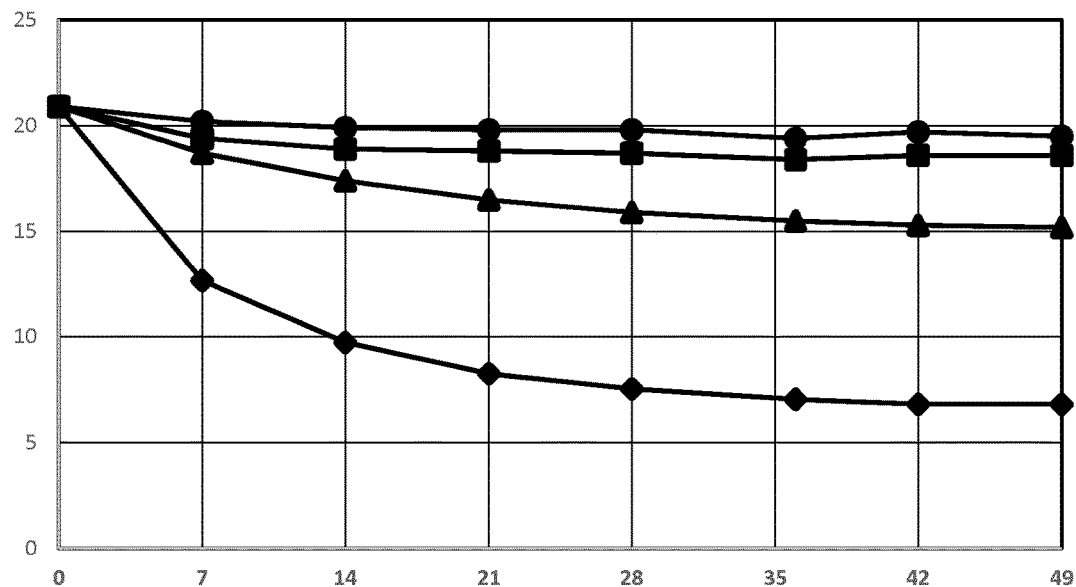
FIG. 1A shows the change of the relative oxygen concentration (y-axis; in %) over time (x-axis; in days) for tested samples.

The present invention and detailed embodiments of the present invention are disclosed herein, but it should be understood that the disclosed embodiments are merely exemplary of the invention, which may be embodied in various forms. The figures are not necessarily to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The polymer composition of the invention comprises a polyether-polyester copolymer, a transition metal catalyst, and an active material that acts on, interacts or reacts with moisture. Preferably, the amount of polyether-polyester copolymer in the polymer composition is from 5 to 50 wt.-%, the amount of transition metal catalyst is from 0.01 to 5 wt.-%, and the amount of active material that acts on, interacts or reacts with moisture is from 0.1 to 95 wt.-% (based on the total weight of the polymer composition).

The polymer composition of the invention can be in any form, including e.g. in the form of a physical mixture (i.e. a mix of components in powder form).

The polyether-polyester copolymer in the polymer composition of the invention is a polymer that reacts with oxygen and is oxidized by this reaction. The transition metal catalyst in the polymer composition of the invention increases the reaction speed so that the oxidation occurs faster than without the catalyst. The active material that acts on, interacts or reacts with moisture in the polymer composition of the invention is able to absorb the water generated during the reaction of the polyether-polyester copolymer with oxygen and also aids in stabilizing the humidity in the environment, preferably at a low value.

Polyether-Polyester Copolymer

The polyether-polyester copolymer of the polymer composition of the invention comprises
  (i) polyether segments wherein at least one polyether segment contains at least one polytetramethylene oxide segment,
  (ii) polyester segments,
  (iii) bridging elements of the structure —CO—$R^2$—CO—, wherein $R^2$ represents an optionally substituted bivalent hydrocarbon residue consisting of 1 to 100 carbon atoms wherein the substituents are preferably $C_1$-$C_5$-alkoxy, nitro, cyano or sulfo or a combination thereof;
  (iv) one or two end-caps $R^1$—O—($C_2$-$C_4$—O—)$_e$-*, wherein $R^1$ is an optionally substituted hydrocarbon residue and e is an integer of from 0 to 1000.

The polyether-ester copolymer of the invention is preferably a non-branched copolymer, but it may also contain small amounts, i.e. up to 10 mol-%, of trifunctional or tetrafunctional comonomers, such as trimellitic anhydride, trimethylpropane, pyromellitic dianhydride, pentaerythritol and other polyacids or polyols generally known in the art.

Beside the polytetramethylene oxide segments, the polyether segments (i) can contain other alkylene oxide segments such as ethylene oxide, propyleneoxide or a combination thereof.

Preferred embodiments of the polyether segments (i) are represented for example, by formulae (I), (Ia), (Ib), and (Ic), and optionally (Id) below:

Formula (I)

(I)

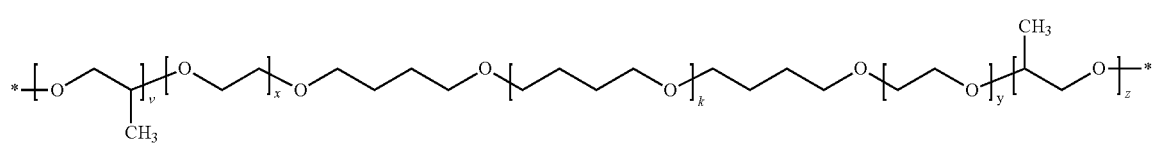

wherein
- k is an integer between 0 and 70, preferably between 0 and 35, particular preferably between 0 and 30;
- v is an integer between 0 and 250, preferably between 0 and 125, particular preferably between 0 and 50;
- x is an integer between 0 and 250, preferably between 0 and 125, particular preferably between 0 and 12;
- y is an integer between 0 and 250, preferably between 0 and 125, particular preferably between 0 and 50;
- z is an integer between 0 and 250, preferably between 0 and 125, particular preferably between 0 and 12;

and the sum of k+v+x+y+z is between 0 and 1070, preferably between 0 and 535.

For v+x>2 and for v and x≠0, and for y+z>2 and y and z≠0, the resulting polyethylenoxide/polypropylenoxide-copolymer part can represent a randomly distributed copolymer or a block-copolymer, wherein both blocks (the polyethylenoxide block alternatively the polypropylenoxide block) can be chemically connected to the polytetramethyleneoxide block.

Formula (Ia)

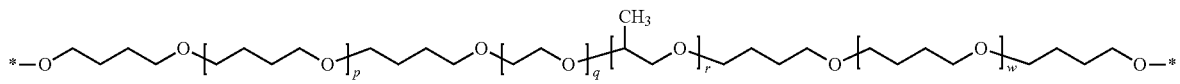
(Ia)

wherein
- p is an integer between 0 and 35, preferably between 0 and 20, particular preferably between 0 and 15;
- w is an integer between 0 and 35, preferably between 0 and 20, particular preferably between 0 and 15;
- q is an integer between 0 and 250, preferably between 0 and 125, particular preferably between 0 and 50;
- r is an integer between 0 and 250, preferably between 0 and 125, particular preferably between 0 and 12;

and the sum of p+w+q+r is between 0 and 570, preferably between 0 and 290.

For q+r>2 and for q and r≠0, the resulting polyethylenoxide/polypropylenoxide-copolymer part can represent a randomly distributed copolymer or a block-copolymer.

Formula (Ib)

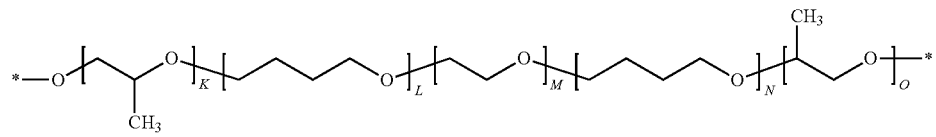
(Ib)

wherein
- K is an integer between 0 and 250, preferably between 0 and 125, particular preferably between 0 and 12;
- L is an integer between 0 and 35, preferably between 0 and 20, particular preferably between 0 and 15;
- M is an integer between 0 and 250, preferably between 0 and 125, particular preferably between 0 and 50;
- N is an integer between 0 and 35, preferably between 0 and 20, particular preferably between 0 and 15;
- O is an integer between 0 and 250, preferably between 0 and 125, particular preferably between 0 and 12;

furthermore L+N cannot be chosen as 0;
and the sum of K+L+M+N+O is between 1 and 820, preferably between 2 and 415.

In the case that K+L>2 and for K, L and M≠0, or in the case that N+O>2 and for N, O and M≠0, the resulting polypropylene oxide/polytetramethylene oxide-copolymer part can represent a randomly distributed copolymer or a block-copolymer wherein both blocks (the polypropylene oxide block alternatively the polytetramethylene oxide block) can be chemically connected to the polyethylene oxide block.

Formula (Ic)

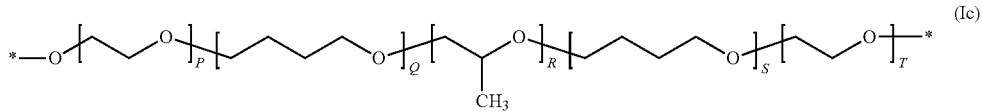

wherein
- P is an integer between 0 and 250, preferably between 0 and 125, particular preferably between 0 and 50;
- Q is an integer between 0 and 35, preferably between 0 and 20, particular preferably between 0 and 15;
- R is an integer between 0 and 250, preferably between 0 and 125, particular preferably between 0 and 12;
- S is an integer between 0 and 35, preferably between 0 and 20, particular preferably between 0 and 15;
- T is an integer between 0 and 250, preferably between 0 and 125, particular preferably between 0 and 50;

furthermore Q+S cannot be chosen as 0;
and the sum P+Q+R+S+T is between 1 and 820, preferably between 2 and 415.

In the case that P+Q>2 and for P, Q and R≠0, or for the case that S+T>2 and for S, T and R≠0, the resulting polyethylene oxide/polytetramethylene oxide-copolymer part can represent a randomly distributed copolymer or a block-copolymer, wherein both blocks (the polyethylene oxide block alternatively the polytetramethylene oxide block) can be chemically connected to the polypropylene oxide block.

Formula (Id)

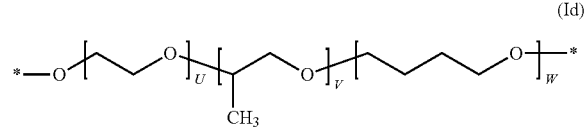

wherein
- U is an integer between 0 and 250, preferably between 0 and 125, particular preferably between 0 and 50;
- V is an integer between 0 and 250, preferably between 0 and 125, particular preferably between 0 and 12;
- W is an integer between 0 and 70, preferably between 0 and 35, particular preferably between 0 and 30;

and the sum U+V+W is between 3 and 570, preferably between 5 and 285.

In this embodiment the polyether segment can either be a homopolymer, a randomly distributed copolymer or a block-copolymer.

In all formulae, the asterisk * represents a bond to a bridging element (iii).

Preferably, the polyester segments (ii) are represented by formula (II):

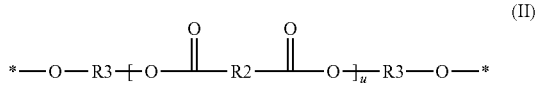

wherein
- * represents a bond to a bridging element (iii),
- R2 and R3 independently of each other represent an optionally substituted hydrocarbon residue consisting of 1 to 100 carbon atoms wherein the substituents are preferably $C_1$-$C_5$-alkoxy, nitro, cyano, and sulfo.
- u is an integer between 1 and 50, preferably between 1 and 30, in particular between 1 and 25.

Preferably, R2 and R3 independently of each other represent an aliphatic hydrocarbon residue of 1 to 24 carbon atoms, an olefinic hydrocarbon residue of 2 to 24 carbon atoms or an aromatic hydrocarbon residue of 5 to 14 carbon atoms, wherein said hydrocarbon residues are optionally substituted with $C_1$-$C_5$-alkoxy, nitro, cyano, or a combination thereof.

In a preferred embodiment, R2 and R3 are an aliphatic hydrocarbon residue consisting of 2 to 18 carbon atoms and most particular preferably consisting of 2 to 6 carbon atoms. The aliphatic hydrocarbon residue can be linear, branched or cyclic. Furthermore, the aliphatic hydrocarbon residue can be saturated or unsaturated. Preferably, it is saturated.

Preferred aliphatic residues are ethylene, 1,2-propylene, 1,3-propylene, 2,2'-dimethyl-1,3-propylene, 1,4-butylene, 2,3-butylene, 1,5-pentylene, 1,6-hexamethylene, 1,7-heptamethylene, 1,8-octamethylene and 1,4-cyclohexylene, and mixtures thereof. Particular preferred residues are ethylene, 1,2-propylene, 1,3 propylene, 2,2'-dimethyl-1,3-propylene, 1,4-butylene, 2,3-butylene and 1,6-hexamethylene, and mixtures thereof. The most particular preferred residues are ethylene, 1,2-propylene and 1,4-butylene, and mixtures thereof.

In a further preferred embodiment, R2 is an aromatic system. The aromatic system can be mono- or polycyclic, such as di- or tricyclic. Preferably, the aromatic system is consisting of 5 to 25 atoms, even more preferably of 5 to 10 atoms. The aromatic system is preferably formed by carbon atoms. In a further embodiment, it consists in addition to carbon atoms of one or more hetero atoms such as nitrogen, oxygen and/or sulfur. Examples of such aromatic systems are benzene, naphthalene, indole, phenanthrene, pyridine, furan, pyrrole, thiophene and thiazole.

Preferred aromatic structure elements for R2 are 1,2-phenylene, 1,3-phenylene, 1,4-phenylene, 1,8-naphtylene, 1,4-naphtylene, 2,2'-biphenylene, 4,4'-biphenylene, 1,3-phenylene-5-sulphonate, 2,5-furanylene and mixtures thereof.

Particularly preferred structure elements for R2 are ethylene, 1,2-propylene, 1,3-propylene, 2,2'-dimethyl-1,3-propylene, 1,4-butylene, 2,3-butylene, 1,6-hexamethylene, 1,4-cyclohexylene, 1,3-phenylene, 1,4-phenylene, 1,8-naphtylene and mixtures thereof. The most particular preferred structure elements for R2 are 1,3-phenylene, 1,4-phenylene, and mixtures thereof.

In another preferred embodiment R3 can be represented by formula (IIa):

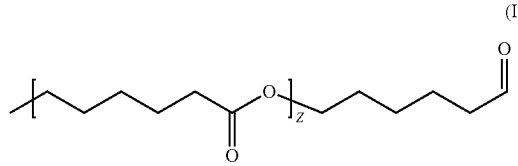
(IIa)

wherein Z can be an integer number from 0 to 100.

The bridging elements (iii) may link the polyether segments (i), polyester segments (ii) and/or the end caps (iv). The bridging elements are described by formula (III):

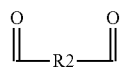
(III)

wherein R2 denotes the meanings given above.
(iv) The end-caps are bonded to a bridging element (iii). The bond is indicated by the asterisk *.

Preferred end-caps can be described by the following general formula

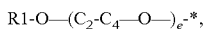

wherein R1 is an aliphatic hydrocarbon residue of 1 to 24 carbon atoms, an olefinic hydrocarbon residue of 2 to 24 carbon atoms, an aromatic hydrocarbon residue of 6 to 14 carbon atoms, wherein said hydrocarbon residues are optionally substituted with $C_1$-$C_5$-alkoxy, nitro, cyano, sulfo, or a combination thereof, and e is an integer of from 0 to 1000, preferably an integer between 0 and 500 and most preferably an integer between 0 and 150.

In a preferred embodiment, R1 is an aliphatic hydrocarbon residue consisting of 1 to 18 carbon atoms and more preferably consisting of 1 to 12 carbon atoms. The aliphatic hydrocarbon residue can be linear, branched or cyclic. Furthermore, the hydrocarbon residue can be saturated or unsaturated. Preferably, it is saturated.

Particularly preferred aliphatic residues for R1 are methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, sec-hexyl, n-heptyl, n-octyl, 2-ethyl-hexyl, n-nonyl, n-decyl, tridecyl, isotridecyl, tetradecyl, hexadecyl, octadecyl, methylphenyl cyclopropyl, cyclobutyl, cyclopentyl, cyclohexyl, cycloheptyl, cyclooctyl, cyclononyl, cyclodecyl. Most preferred residues are methyl, ethyl and n-dodecyl. The most particular preferred residue is methyl.

In a further preferred embodiment, R1 can be represented by an aromatic system. The aromatic system can be mono- or polycyclic, such as di- or tricyclic. Preferably, the aromatic system is consisting of 6 to 14 carbon atoms, even more preferably of 6 to 10 atoms. The aromatic system is preferably formed by carbon atoms. In a further embodiment, it consists in addition to carbon atoms of one or more hetero atoms such as nitrogen, oxygen and/or sulfur. Examples of such aromatic systems are benzene, naphthalene, indole, phenanthrene, pyridine, furan, pyrrole, thiophene and thiazole. In addition, the aromatic system can be chemically connected to one, two, three or more identical or different functionalities. Suitable functionalities are for example alkyl-alkenyl-, alkoxy-, poly (alkoxy), cyano-, and/or nitro-functionalities. These functionalities may be bonded to any position of the aromatic system.

($C_2$-$C_4$—O—) is a short form for "$C_2$ to $C_4$-oxide" or in other words depicts an ethylene- and/or propylene- and/or tetramethylene-oxide-residue.

Particularly preferred groups R1-O—($C_2$-$C_4$—O—)$_e$-* correspond to the following formulae

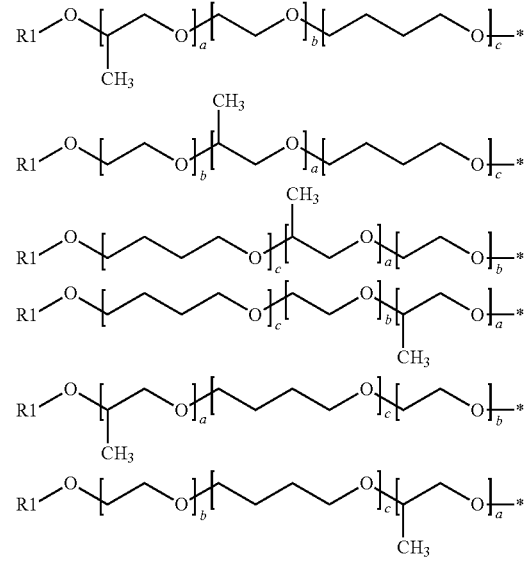

wherein the different monomers are distributed randomly, in blocks or a combination of random and block
  b can be chosen as an integer between 0 and 250, preferably between 0 and 125, particular preferably between 0 and 50
  a can be chosen as an integer between 0 and 250, preferably between 0 and 125, particular preferably between 0 and 12.
  c can be chosen as an integer between 0 and 70, preferably between 0 and 35, particular preferably between 0 and 30, and the sum a+b+c is of from 0 to 570; and
  R1 is as defined above.

The number average of the molecular weight for the copolymers of the present invention is preferably between 2000 and 1000000 g/mol, more preferably between 3500 and 100000 g/mol, most preferably between 5000 and 50000 g/mol.

The mass ratio Ω, defined as the mass ratio between the poly(tetramethyleneoxide) content and the overall content of all dicarbonyl structure elements, i.e. in (ii) and (iii), of the copolymers of the present invention is preferably between 0.1 and 10, more preferably between 0.2 and 5 and most preferably between 0.5 and 2.

The mass ratio Θ, defined as the mass ratio between the endcap content and the overall content of all dicarbonyl structure elements, i.e. in (ii) and (iii), of the copolymers of the present invention is preferably between 0.001 and 100, more preferably between 0.005 and 50 and most preferably between 0.01 and 2.

The copolymers of the present invention can be prepared by polycondensation of at least one polyether segment containing at least one polytetramethylenoxide segment, at least one polyester segment, at least one bridging element and at least one end-cap R1-O—($C_2$-$C_4$—O—)$_e$-*.

Starting compounds providing polyether segments (i) according to the invention can be homo or copolymers, copolymers may be block, random or segmented. Examples for starting compounds are: poly(tetrahydrofuran)-diol, poly(propyleneglycol)-diol, poly(ethyleneglycol)-diol, poly(ethylenglycol)-co-poly(propylenglycol)-diol, poly(ethylenglycol)-co-poly(tetrahydrofuran)-diol, poly(propylenglycol)-co-poly(tetrahydrofuran)-diol and poly(ethyleneglycol)-co-poly(propylenglycol)-co-poly(tetrahydrofuran)-diol.

The polyester segment can be synthesized in-situ during the polycondensation reaction or introduced as pre-synthezised building block at the beginning of the reaction. Preferred polyester segments are those resulting from the condensation reaction of dibasic acids, or esters or anhydrides thereof, and diols.

Examples for starting compounds providing polyester segments (ii) according to the invention are dimethyl terephthalate, terephthalic acid, dimethyl isophthalate, isophtalic acid, dimethyl adipate, adipic acid, azelaic acid, sebacic acid, dodecanoic diacid, 1,2 cyclohexane dicarboxylic acid, dimethyl-1,4-cyclohexane dicarboxylate ester, and ethyleneglycol, 1,2-propanediol, 1,3-propanediol, 1,4-butanediol, 1,4-cyclohexanedimethanol, 2,2-dimethyl-1,3-propanediol, 1,6-hexanediol, diethyleneglycol, triethyleneglycol, poly(ethylene terephthalate) and poly(butylene terephthalate).

Examples for starting compounds providing bridging elements (iii) according to the invention are dimethyl terephthalate, terephthalic acid, dimethyl isophthalate, isophtalic acid, dimethyl adipate, adipic acid, azelaic acid, sebacic acid, dodecanoic diacid, 1,2 cyclohexane dicarboxylic acid, dimethyl-1,4-cyclohexane dicarboxylate ester.

Examples for starting compounds providing end caps are mono methoxylated poly(ethyleneglycol)-monool, mono methoxylated poly(ethylenglycol)-co-poly(propylenglycol)-monool, lauryl-alcohol ethoxylate, oleyl-alcohol ethoxylate, nonyl-phenol ethoxylate, n-dodecanol, oleyl-alcohol.

For the preparation of the copolymers of the present invention, typically a two stage process is used of either direct esterification of diacids and diols or transesterification of diesters and diols, followed by a polycondensation reaction under reduced pressure.

A suitable process for the preparation of the copolymers of the present invention comprises heating suitable starting compounds for segments (i) to (iv) with the addition of a catalyst, to temperatures of 160 to 220° C., expediently beginning at atmospheric pressure, and then continuing the reaction under reduced pressure at temperatures of from 160 to 240° C.

Reduced pressure preferably means a pressure of from 0.1 to 900 mbar and more preferably a pressure of from 0.5 to 500 mbar.

Typical transesterification and condensation catalysts known in the art can be used for the preparation of the copolymers, such as antimony, germanium and titanium based catalysts. Preferably, tetraisopropyl orthotitanate (IPT) and sodium acetate (NaOAc) are used as the catalyst system in the process.

The polyether-polyester copolymer is preferably in the form of particles. Preferably, the polyether-polyester copolymer is in powder form. The powder typically has a "mass median diameter" $D_{50}$ of less than 1000 µm, preferably less than 800 µm, more preferably between 100 and 500 µm, measured using a Laser granulometer Malvern Mastersizer 3000. The intercept for 90% of the cumulative mass $D_{90}$ is preferably between 300 and 1000 µm, measured using a Laser granulometer Malvern Mastersizer 3000.

Active Material that Acts on, Interacts or Reacts with Moisture

The active material in the polymer composition of the present invention acts on, interacts or reacts with moisture. It thereby absorbs moisture from the environment. Typically, the active material is immiscible with the other components in the polymer composition. Also typically, the active material of the polymer composition of the invention is present in an amount of 0.1 wt.-% or more, but preferably not more than 95 wt.-%.

The active material may be in the form of particles.

Typically, the active material is an absorbing material. Further typically, the active material is selected from the group comprising desiccants.

Suitable desiccants are materials able to absorb or adsorb moisture from their surrounding atmosphere. Such materials are for example, silica gel, molecular sieves or zeolites, calcium oxide, calcium chloride, deliquescent salts, prehydrated silica gels.

The term "desiccant" as used herein relates to any material capable of absorbing, adsorbing, or removing moisture from a surrounding atmosphere by any mechanism such as a chemical reaction or physical interaction, such as e.g. reversible adsorption. Said desiccant can be organic or inorganic. Non-limiting examples of desiccants include silica gel, zeolites (also referred to as molecular sieves), desiccant clays, such as bentonite clay and montmorillonite, activated carbon, metal compounds, in particular oxides, chlorides, sulfates and others which have the property to absorb and/or react with water from a surrounding atmosphere. Exemplary metal salts are alkali metal salts and alkaline earth metal salts such as $Na_2SO_4$, $MgSO_4$, $CaSO_4$, $CaCl_2$), MgO, CaO and BaO.

Examples for zeolites suitable for water absorption are materials known under the name "Linde Type A" (LTA) ("Zeolite A") such as Zeolite MS 3A, Zeolite MS 4A, Zeolite MS 5A or Zeolites with higher pore size. A detailed compilation of zeolites is listed in EP0881193B1 and in "Atlas of Zeolite Framework Types" published on behalf of the Structure Commission of the International Zeolite Association (Ch. Baerlocher, W. M. Meier, D. H. Olson, eds., Elsevier 2001).

In preferred embodiments, the desiccant is selected from the group consisting of silica gel and zeolites, and any combination thereof. A particularly preferable desiccant comprises Zeolite MS 4A and/or Zeolite MS 3A. An exemplary desiccant grade that has proven suitable for the purpose of the present invention is Siliporite® NK10AP or Siliporite® NK10 Beads, molecular sieves obtainable from Ceca. Other suitable molecular sieves include Sylobead® MS 564 from GRACE (a Zeolite MS 3A type), as well as Siliporite® G5 Beads from Ceca, Siliporite® NK10 Pellets from Ceca, and HYG04C from Hengye (all Zeolite MS 4A types).

Typically, the active material is present in the polymer composition of the present invention in an amount of 0.1 wt.-% or more. Preferably, the active material is present in the polymer composition of the present invention in an amount of 95 wt.-% or less. A useful range therefore is from 40 wt.-% to 80 wt.-% (range limits included), in particular at approximately 70 wt.-%.

Preferably, in the polymer composition of the present invention, the amount of the active material is at least twice the amount (by weight) of the polyether-polyester copolymer. This has the advantage of increasing the capacity of the composition by decreasing the level of relative humidity.

Transition Metal Catalyst

The transition metal catalyst of the polymer composition of the invention is present preferably in a concentration of 0.001 to 5 wt.-%, more preferably 0.1 to 3 wt.-%, most preferably between 0.5 and 1.5 wt.-%, based on the total weight of the composition.

Preferably, in the polymer composition, the amount of the transition metal catalyst is between 0.5 to 5%, more preferably 2 and 3% by weight of the polyether-polyester copolymer plus transition metal catalyst. This has turned out to be the optimum relative quantity for the desired oxygen scavenging effect.

The transition metal catalyst is preferably in the form of particles. Preferably, the transition metal catalyst is in powder form. The powder has preferably a "mass median diameter" $D_{50}$ of less than 800 µm, more preferably less than 500 µm, measured using a Laser granulometer Malvern Mastersizer 3000.

Without being bound by any theory, it is believed that the polyether-polyester copolymer is an oxidisable substrate in which the end-caps at the end of the chains are capable of controlling the oxygen ingress and providing a controlled active oxygen barrier. The speed of the oxygen scavenging reaction can be modified by the amount and the chemical constitution of the end-caps.

The transition metal catalyst also initiates and accelerates the rate of oxygen consumption. The mechanism by which this transition metal functions is not fully understood yet. The catalyst may or may not be consumed with oxygen, or if consumed, may only be consumed temporarily by converting back to a catalytically active state.

More preferably, the transition metal catalyst is in the form of a salt, with the transition metal selected from the first, second or third transition series of the Periodic Table of the Elements. Suitable metals and their oxidation states include, but are not limited to, manganese II or III, iron II or III, cobalt II or III, nickel II or III, copper I or II, rhodium II, III or IV, and ruthenium. The oxidation state of the metal when introduced does not need to be that of the active form. The metal is preferably iron, nickel, manganese, cobalt or copper; more preferably manganese or cobalt; and even more preferably cobalt. Suitable counterions for the metal include, but are not limited to, chloride, acetate, acetylacetonate, propionate, oleate, stearate, palmitate, 2-ethyl hexanoate, octanoate, neodecanoate or naphthenate.

The metal salt can also be an ionomer, in which case a polymeric counterion is employed. Such ionomers are well known in the art.

Even more preferably, the salt, the transition metal, and the counterion are either compliant with country regulations in the matter of food contact materials or, if part of a packaging article, exhibit substantially no migration from the oxygen barrier composition to the packaged contents. Particularly preferable salts include cobalt oleate, cobalt propionate, cobalt stearate, and cobalt neodecanoate.

The blend of the three components can be obtained in any suitable way, including
- Mixing the polyether-polyester copolymer, optionally in micronized form, with the transition metal catalyst, also optionally micronized form, and then, adding the active material; or
- Mixing the polyether-polyester copolymer, optionally in micronized form, with the active material, and then adding the transition metal catalyst, optionally in micronized form; or
- Mixing the transition metal catalyst, optionally in micronized form, with the active material, and then adding the polyether-polyester copolymer, optionally in micronized form.

The present invention further provides for a method of providing an active oxygen barrier in a plastic material of a packaging article comprising incorporating an effective amount of the polymer composition of the invention into a thermoplastic polymer material which is preferably a polyester, a polyolefin, a polyolefin copolymer or a polystyrene.

Therefore, a further subject of the present invention is an active oxygen barrier composition comprising the polymer composition as described before.

A further subject of the invention is a plastic material comprising:
- a component a) which is a thermoplastic polymer, preferably selected from the group consisting of polyesters, polyolefins, polyolefin copolymers and polystyrenes; and
- a component b) which is a polymer composition as described in the foregoing.

The plastic material can be a masterbatch, a compound, or a formed article.

Depending on its use the plastic material can contain component b) in an amount of from 0.5 to 99.995 wt.-% or more preferably 1 to 99.8 wt.-%, based on the total weight of the plastic material.

Possible components a) within the meaning of the invention are polyesters. The intrinsic viscosity values of the polyesters are set forth in dL/g units as calculated from the inherent viscosity measured at 25° C. in 60/40 wt/wt phenol/tetrachloroethane. The intrinsic viscosity of the polyesters preferably ranges from about 0.55 to about 1.14 dL/g.

Preferred polyesters are the ones resulting from the condensation reaction of dibasic acids and glycols.

Typically, the dibasic acid comprises an aromatic dibasic acid, or ester or anhydride thereof, and is selected from the group consisting of isophthalic acid, terephthalic acid, naphthalene-1,4-dicarboxylic acid, naphthalene-2,6,-dicarboxylic acid, phthalic acid, phthalic anhydride, tetrahydrophthalic anhydride, trimellitic anhydride, diphenoxyethane-4,4'-dicarboxylic acid, diphenyl-4,4'-dicarboxylic acid, 2,5-furandicarboxylic acid and mixtures thereof. The dibasic acid also can be an aliphatic dibasic acid or anhydride, such as adipic acid, sebacic acid, decan-1,10-dicarboxylic acid, fumaric acid, succinic anhydride, succinic acid, cyclohexanediacetic acid, glutaric acid, azeleic acid, and mixtures thereof. Other aromatic and aliphatic dibasic acids known to persons skilled in the art also can be used. More preferably, the dibasic acid comprises an aromatic dibasic acid, optionally further comprising up to about 20% by weight of the dibasic acid component, of an aliphatic dibasic acid.

Preferably, the glycol or diol component of the polyester is selected from the group consisting of ethylene glycol, propylene glycol, butane-1,4-diol, diethylene glycol, a polyethylene glycol, a polypropylene glycol, neopentyl glycol, a polytetramethylene glycol, 1,6-hexylene glycol, pentane-1,5-diol, 3-methylpentanediol-(2,4), 2-methylpentanediol-(1,4), 2,2,4-trimethylpentane-diol-(1,3), 2-ethylhexanediol-(1,3),2,2-diethylpropanediol-(1,3), hexanediol-(1,3), 1,4-di-(hydroxy-ethoxy) benzene, 2,2-bis-(4-hydroxycyclohexyl) propane, 2,4-dihydroxy-1,1,3,3-tetramethylcyclobutane, 2,2-bis-(3-hydroxyethoxyphenyl) propane, 2,2-bis-(4-hydroxypropoxyphenyl) propane, 1,4-dihydroxymethyl-cyclohexane, and mixtures thereof. Additional glycols known to persons skilled in the art also can be used as the glycol component of the polyester.

Two preferred polyesters are polyethylene terephthalate (PET) and polyethylene naphthalate (PEN). The PET and PEN can be homopolymers, or copolymers further containing up to 10 mole percent of a dibasic acid different from terephthalic acid or a naphthalene dicarboxylic acid, and/or up to 10 mole percent of a glycol different from ethylene glycol.

PEN is preferably selected from the group consisting of polyethylene naphthalene 2, 6-dicarboxylate, polyethylene naphthalene 1,4-dicarboxylate, polyethylene naphthalene 1,6-dicarboxylate, polyethylene naphthalene 1,8-dicarboxylate, and polyethylene naphthalene 2,3-dicarboxylate. More preferably, PEN is polyethylene naphthalene 2,3-dicarboxylate.

More preferably the plastic material is selected from the group consisting of PET, e.g. virgin bottle grade PET and postconsumer PET (PC-PET), cyclohexane dimethanol/PET copolymer (PETG), polyethylene naphthalate (PEN), polybutylene terephthalate (PBT), and mixtures thereof.

Also preferred plastic materials are biobased polymers, preferably polyethylene furanoate (PEF) and also biodegradable polyester, preferably selected from the group consisting of PLAs (Polylactic acid), polycaprolactones (PCL) and polyhydroxybutyrates (PHB); and bio-based polyesters, which are derived from renewable resources such as corn and sugar cane and the by-products associated with their harvesting and processing but are not biodegradable.

Preferably, component a) is a polyolefin.

Preferred polyolefins and polyolefin copolymers, i.e. component a) within the meaning of the invention, are thermoplastic polyolefins known in the art and are selected from the group consisting of
  polyethylene (PE), preferably selected from the group consisting of high density polyethylene (HDPE), medium density polyethylene (MDPE), low density polyethylene (LDPE), linear low density polyethylene (LLDPE), metallocene low density polyethylene (mLDPE) and metallocene linear low density polyethylene (mLLDPE),
  polypropylene (PP), preferably selected from the group consisting of polypropylene homopolymer (PPH), polypropylene random copolymer (PP-R) and polypropylene block copolymers (PP-block-COPO),
  PE copolymers, preferably selected from the group consisting of ethylene-vinyl acetate copolymers (EVA), copolymers of ethylene and methyl acrylate (EMA), copolymers of ethylene and butyl acrylate (EBA), copolymers of ethylene and ethyl acrylate (EEA), and cycloolefin copolymers (COC),
  general purpose polystyrene (GPPS) and high impact polystyrene (HIPS); more preferably of
  high density polyethylene (HDPE) and low density polyethylene (LDPE) polypropylene homopolymer (PPH), general purpose polystyrene (GPPS).

Preferred polystyrenes, i.e. component a) within the meaning of the invention, can be a styrene homopolymer, an alkylstyrene homopolymer, preferably a $C_1$-$C_4$-alkylstyrene homopolymer, for example α-methylstyrene homopolymer; a styrene copolymer, especially a high impact polystyrene (HIPS).

High impact polystyrenes (HIPS) are generally prepared by polymerization by grafting mixtures of styrene and optionally of one or more copolymerizable vinyl monomers, preferably mixtures of styrene, methylstyrene, ethylstyrene, butylstyrene, halostyrenes, vinylalkylbenzenes, such as vinyltoluene, vinylxylene, acrylonitrile, methacrylonitrile, lower alkyl esters of methacrylic acid, in the presence of a rubbery polymer trunk comprising copolymers chosen from polybutadiene, polyisoprene, rubbery styrene-diene copolymers, acrylic rubber, nitrile rubber and olefinic rubbers, such as propylene diene monomer rubber (PDM) and propylene rubber (PR). In the high impact polystyrene, the rubbery polymer trunk normally constitutes from 5 to 80% by weight, preferably 5 to 50% by weight, of the total weight of the grafted polymer.

Other suitable polymers include polyvinylchloride (PVC), and polytetraflourethylene (PTFE).

The composition of the present invention may further comprise additional components known in the art such as plasticizers, stabilizers, lubricators, and coloring agents, and mixtures thereof mixed in the composition. The coloring agent can be added as a colorant master batch such as for example white master batch CM PPN BLANC 551 A, commercially available from PolyOne.

Optionally, the polymer composition and the plastic material of the present invention comprises one or more further substances (component c), which are selected from the group consisting of
  natural colorants derived from plants or animals and synthetic colorants, preferred synthetic colorants being synthetic organic and inorganic dyes and pigments,
    preferred synthetic organic pigments being azo or disazo pigments, laked azo or disazo pigments or polycyclic pigments, particularly preferably phthalocyanine, diketopyrrolopyrrole, quinacridone, perylene, dioxazine, anthraquinone, thioindigo, diaryl or quinophthalone pigments;
    preferred synthetic inorganic pigments being metal oxides, mixed oxides, aluminium sulphates, chromates, metal powders, pearlescent pigments (mica), luminescent colours, titanium oxides, cadmium lead pigments, iron oxides, carbon black, silicates, nickel titanates, cobalt pigments or chromium oxides;
  surfactants;
  auxiliaries, preferably acid scavengers, processing aids, coupling agents, lubricants, stearates, blowing agents, polyhydric alcohols, nucleating agents, or antioxidants, e.g. stearates, or oxides such as magnesium oxide;
  antioxidants, preferably primary or secondary antioxidants;
  antistatic agents;
  compatibilizers for polyester/polyamide blends;
  UV absorbers, slip agents, anti-fogging agents, anti-condensation agents, suspension stabilizers, anti-blocking agents, waxes, and a mixture of these substances.

More preferably, component c) is selected from the group consisting of compatibilizers, UV absorbers, antioxidants and colorants.

Component c) can be present in an amount of from 0 to 60 wt.-%, preferably 0.001 to 50 wt.-%, more preferably 0.1 to 30 wt.-%, most preferably 1 to 25 wt.-%, based on the total weight of the plastic material.

The plastic material of the present invention is expediently formed, e.g. blow molded, injection molded or extrusion molded, into a plastic article.

Therefore, another subject of the present invention is a formed plastic article comprising said plastic material.

The formed plastic article according to the invention can be a packaging material, preferably a container, a film or a sheet, especially for use in packaging of personal care, cosmetics, household, industrial, food and pharmaceutical or medicine products where a high oxygen barrier and/or a low oxygen content/rate is needed.

Packaging materials can be flexible, rigid, semi-rigid or combinations thereof. Rigid packaging articles typically have wall thicknesses in the range of 100 to 3000 micrometers. Typical flexible packages typically have thicknesses of 5 to 250 micrometers.

Rigid packaging articles or flexible films of the invention can consist of a single layer or may comprise multiple layers.

When a packaging article or film comprises an oxygen scavenging layer, it can further comprise one or more additional layers, one or more of the additional layers comprising an oxygen barrier layer or being permeable to oxygen. Further additional layers, such as adhesive layers, can also be used in a multi-layer packaging article or film.

Another subject of the invention is a method for the manufacture of a plastic article as defined above, characterized in that the components a), b), and optionally c), are physically mixed with one another and subjected to a shape forming process.

For physical mixing, it is possible to use a mixing apparatus customary in the plastics industry. Preferably, the mixing apparatus can be one used to make a liquid masterbatch or a solid masterbatch or can be a combination of those apparatuses.

A mixing apparatus for a liquid masterbatch can be a high speed dispersor (e.g. of Cowles™ type), a media mill, a three-roll mill, a submill or a rotor-stator type dispersor.

A mixing apparatus used to make solid masterbatches MB or compounds CO can be a mixer, extruder, kneader, press, mill, calendar, blender, injection moulding machine, injection and stretch blow moulding machine (ISBM), extrusion blow moulding machine (EBM), compression moulding machine, compression and stretch blow moulding machine; more preferably a mixer, extruder, injection moulding machine, injection and stretch blow moulding machine, compression moulding machine, compression and stretch blow moulding machine; even more preferably a mixer, extruder, injection and stretch blow moulding machine and extrusion blow moulding machine.

The shape forming process for the article is dependent on the desired shape of article to be manufactured.

Containers are preferably made by blow molding, injection molding, injection and stretch blow molding, extrusion molding, extrusion blow molding, compression molding, compression and stretch blow molding processes.

Films and sheets are preferably made by cast or blown film extrusion or co-extrusion processes, depending on the thickness required and on the number of layers needed to obtain specific properties, eventually followed by post-extrusion shaping processes like thermoforming or stretching. In the thermoforming process, the plastic sheet is heated to a pliable forming temperature, formed to a specific shape in a mold, and trimmed to create a final article. If vacuum is used, this process is generally called vacuum forming. In post-extrusion stretching processes an extruded film can be, for example, biaxially oriented by drawing. All the above listed processes are well-known in the art.

The mixing of the components can occur in one step, two steps or in a plurality of steps.

Mixing can occur in one step when the components a), b), and optionally component c) or only b), and optionally component c), are directly metered and/or let down in a form of liquid or solid concentrates or as pure components, for example in an injection and stretch blow molding machine.

The mixing can also occur in two or three steps, wherein in a first step components b), and optionally c) are predispersed into component a), and in one or more consecutive steps are added to component a).

Mixing can also occur in two or three steps, wherein in a first step components c) is predispersed into component a) and the component b) is directly metered and/or let down as pure component, for example in an injection and stretch blow molding machine.

Preferably, component b) and component c) are predispersed into component a) to form two separate masterbatches, and then these masterbatches are combined with components a).

In one preferred embodiment, in a first step, component b) is dispersed into component a) while component c) is dispersed into component a) to provide two separate masterbatches. After being melt compounded, for example in a single or twin screw extruder, the extrudates are withdrawn in strand form, and recovered as pellets according to the usual way, such as cutting. In a second step, the obtained masterbatches are metered and let down by a converter/compounder into the main stream of component A pellets, for example in an injection and stretch blow molding machine. These extrudates can be metered and let down into the main stream of component a) directly into an injection process avoiding the compounding process.

In another embodiment, in a first step, component b) and optionally component c) are dispersed into component a) to provide a masterbatch. After being melt compounded, for example in a single or twin screw extruder, the extrudate is withdrawn in strand form, and recovered as pellets according to the usual way such as cutting. In a second step, the obtained solid masterbatch is metered and let down by a converter/compounder into the main stream of component a) of e.g. an injection and stretch blow molding machine, at a rate corresponding to the final desired concentration of component b) and optionally component c) in the article.

Mixing preferably occurs continuously or batchwise, more preferably continuously; in case of a solid masterbatch MB preferably by extrusion, mixing, milling or calendering, more preferably by extrusion; in case of a liquid masterbatch MB preferably by mixing or milling; in case of a compound CO preferably by extrusion or calendaring, more preferably by extrusion.

Mixing is preferably carried out at a temperature of from 0 to 330° C. The mixing time is preferably of from 5 sec to 36 h, preferably 5 sec to 24 h. The mixing time in the case of continuous mixing is preferably of from 5 sec to 1 h. The mixing time in the case of batchwise mixing is preferably of from 1 sec to 36 h.

In the case of a liquid masterbatch MB, mixing is preferably carried at a temperature of from 0 to 150° C. with a mixing time of from 0.5 minutes to 60 minutes.

In the case of a solid masterbatch MB or a compound CO, mixing is preferably carried out at a temperature of from 80 to 330° C. with a mixing time of from 5 sec to 1 h.

Another subject of the present invention is an article of manufacture comprising the composition as defined above.

The article of manufacture can comprise the composition as part of its material or plastic material. The article of manufacture may be the plastic article as defined above. For example, the article of manufacture can be a container, a bottle or an insert made of a plastic material comprising a component a) and a component b).

The article of manufacture can also be a compressed tablet made of the composition or made of a plastic material comprising the composition.

Alternatively, the article of manufacture can be provided with a compartment or space comprising the composition. For example, it can be a plastic stopper comprising a chamber or compartment filled with the composition, a canister filled with the composition, a packet made of a breathable material and filled with the composition, etc.

Specific articles of the present invention include preforms, containers, films and sheets for packaging of food, cosmetics, pharmaceutical or medical and personal care products where a high oxygen barrier is needed. Examples of containers are bottles or vials. The compositions of the present invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen.

Preferred articles of the present invention are rigid packaging articles, such as bottles and thermoformed sheets and flexible films.

Further aspect of the present invention concerns monolayer films. The term monolayer film or monolayer cast film or monolayer sheet indicates the semi-finished product consisting of the sheet (preform) usually obtained by means of extrusion of the films forming the layer. The sheet obtained has not undergone any preferential orientation process and is therefore unoriented. The sheet can be afterwards transformed into a finished article such as a container by means of known processes which do not induce orientation, usually by means thermoforming. The term "container" refers any article having an opening for the introduction of a product, particularly food products.

The article of manufacture of the present invention comprises the polymer composition as disclosed above. Typically, the article of manufacture is a molded article, preferably an injection molded article. Other methods of manufacture are also possible, including extrusion, extrusion blow molding, injection blow molding.

In a preferred embodiment, the article of manufacture is molded using an in-mold compounder, for example as produced by Krauss-Maffei.

In one embodiment, the article of manufacture is an insert, a cartridge, or a flow reducer comprising the polymer composition of the invention.

The article of manufacture produced from the composition of the invention can have any shape. A non-exhaustive list includes pellets, plates, films, as well as injection molded, blow molded, extruded, or blow-extruded parts. The article of manufacture may be used as a function layer in a multi-layer structure for example in multi-layer films, multilayer containers, bottles or vials, as will be detailed below.

Typically, the article of manufacture makes use of the fact that the composition of the present invention has numerous applications. One exemplary application is the construction of rigid containers, which are suitable for containing volumes of product such as foodstuffs and medicines. In many cases, these types of products must be shipped and stored in controlled environments (e.g., reduced moisture and/or oxygen). In an embodiment, the article of manufacture is an insert. The polymer composition of the present invention may be formed into an insert for inclusion within the interior of the container.

In other embodiments of the article of manufacture, an oxygen scavenging insert may be formed from the polymer composition of the present invention; this insert can be formed as a liner having an exterior surface substantially conforming to an interior surface of a container body.

In another embodiment of the article of manufacture, the polymer composition of the present invention may be used to form an entrained polymer sheet that is joined with another sheet made from a different polymer. The two sheets are effectively laminated one to the other so that the sheet (not made from the polymer composition of the present invention) can form a substantially gas impermeable exterior layer. The laminate of sheets may then be used to wrap an item which is to be stored in a controlled environment. The two sheets could be joined by, for example, thermal extrusion. Such sheets are well known in the art, e.g. from US2006/0269708.

The invention also relates to a packaging comprising the composition of the invention and/or the article of manufacture of the invention. It can for example be a packaging comprising a molded article made of the polymer composition of the invention. The packaging can be a sealed pouch comprising one or more articles for example to preserve them from oxygen, a vial (with insert), a pharmaceutical or medical packaging.

The invention also relates to a medical or pharmaceutical packaging element comprising the composition of the invention and/or the article of manufacture of the invention.

The polymer composition of the invention can be used in powder form or included in a polymer matrix, as described above. The latter can be regarded as a masterbatch, e.g. in the form of pellets, that in turn can be used to produce injection molded articles, such as canisters, balls, inserts, active layers in a multilayer blister, pouch or film, or active layers in mono- or multilayer bottles. Suitable applications of the powder form or the pelletized masterbatch include the use inside capsules, canisters, packets, washers or stoppers, as well as in compressed tablets.

To determine the oxygen scavenging capabilities of the copolymers of the invention, the rate of oxygen scavenging can be calculated by measuring the time elapsed until the article has depleted a certain amount of oxygen from a sealed container.

Another definition of acceptable oxygen scavenging is derived from testing actual packages.

The oxygen scavenging capacity of an article comprising the invention can be measured by determining the amount of oxygen consumed until the article becomes ineffective as a scavenger.

The polymer composition of the present invention provides an oxygen scavenging system with high oxygen scavenging capacity, exact fine-tuning of oxygen transmission rate into the inner of the package. The oxygen absorption capacity is at least 150 ml oxygen per gram of polyetherpolyester copolymer plus transition metal catalyst, in a container comprising 2 L of air, at 7 days and 25° C.

The invention also relates to the use of the polymer composition of the invention as an oxygen scavenging material. In particular, it relates to the use in which the polymer composition is comprised in a packaging for oxygen-, and optionally moisture sensitive goods.

EXAMPLES

The present invention will be illustrated in greater detail by the following specific examples. It is understood that these examples are given by way of illustration and are not meant to limit the disclosure or claims. For example, although specific relative humidity and temperature values may be provided, the polymer composition of the present invention is also suited for other conditions. All percentages in the examples or elsewhere in the specification are by weight unless otherwise specified.

Test Methods

The product properties are determined by the following methods, unless indicated otherwise:

Values of density are determined in accordance with ASTM D792 (g/cm$^3$).

Values of melt flow rate (MFR) are determined in accordance with ASTM D1238 (g/10 min at specified temperature and weight).

Measurement Method for Oxygen Scavenging Activity

A cast film containing suitable scavenging composition is introduced into a glass bottle equipped with an optical sensor and a rubber cap.

Measurement of the oxygen level in the free headspace of the bottle is then carried out using two different techniques. One of them is a non-invasive oxygen measurement sensor and a Fibox® transmitter. The other one is CheckMate 3 O$_2$ (Zr).

For both of them, data are collected in parallel for at least two samples of the same composition, at regular time intervals. For each sample, the oxygen consumption at a certain time is calculated as the difference between the oxygen content measured at that time and the oxygen measured at time 0 which was near 21%. The oxygen consumption is then averaged over the number of samples measured for each composition and plotted against the time.

% by weight mentioned in the following examples are based on the total weight of the mixture, composition or article (unless otherwise stated); parts are parts by weight;

"ex" means example; "cpex" means comparative example; MB means masterbatch; CO means compound, "D" means direct metering in the respective additives.

Equipment Used

The equipment used to perform the production tests of the PET cast film described below consisted of single screw extruder, screw diameter 25 mm
1 filter changer with 40 micron filter mesh
1 flat head die width 350 mm for producing a monolayer film
1 horizontal calendar with 3 rollers Substances Used Component a: A1:

Polyethylene terephthalate (PET) having a density from 1.35 to 1.45 g/cm$^3$ and intrinsic viscosity from 0.74 to 0.78 dl/g (ASTM D3236-88).

Component a: A2:

Polybutylene terephthalate (PBT) having a density from 1.28 to 1.32 g/cm$^3$ and intrinsic viscosity from 0.90 to 1.00 dl/g (ASTM D3236-88).

Component b: B1-B13:

The polyester-ethers were prepared using the following general procedure:

In a 500 ml multinecked flask equipped with a KPG-stirrer, a vigreux column, a vacuum supply and a distillation bridge, the chemicals according to Table 1 are placed into the reactor under a nitrogen atmosphere and in an amount as given in Table 1. The mixture is heated to an internal temperature of 60° C., followed by the addition of 200 μl tetraisopropyl orthotitanate.

Within 2 hours, the temperature of the reaction mixture is continuously increased to 230° C. under a weak nitrogen flow (5 l/h) and held at this temperature for 2 hours. After reaching 70° C., methanol starts to distill of. After reaching 190° C., ethylene glycol continuously starts to distill of. Thereafter, the N$_2$-flow is stopped and the pressure of the reaction mixture is continuously decreased to 400 mbar at 230° C. within 165 minutes, followed by a further continuous pressure decrease to 1 mbar within 90 minutes. In the next step, the reaction mixture is stirred at a pressure of 1 mbar and an inner temperature of 230° C. for additional 4 hours. After the end of this time period, the inner pressure of the reaction flask is set back to 1 bar using N$_2$ and the polymer melt is subsequently removed from the reactor and allowed to solidify.

To determine the molecular weight of the Polyester-ether, GPC measurements were done under the following conditions:

Columns: 1×PSS SDV Guard, 5 μm, 50 mm×8.0 mm ID
1×PSS SDV 100 Å, 5 μm, 300 mm×8.0 mm ID
1×PSS SDV 1000 Å, 5 μm, 300 mm×8.0 mm ID
1×PSS SDV 100000 Å, 5 μm, 300 mm×8.0 mm ID
Detector: RI
Oven temperature: 40° C.
Flow: 1 ml/min
Injection volume: 50 μl
Eluent: THF
Evaluation: PSS-WinGPC Version 8.2
Calibration: Polystyrene standards in the range from 682-1,670,000 Dalton
Internal Standard: Toluene
Injection concentration: 4 g/l in THF

TABLE 1

| Sample | DMT/g | DMI/g | Poly-THF 1000/g | Poly-THF 2000/g | PEG 1000/g | PR-1000/g | MPEG 750/g | M41/g | ε-Caprolactone/g |
|---|---|---|---|---|---|---|---|---|---|
| B1 | 48.5 | | | 50.0 | 25.0 | | 25.0 | | |
| B2 | 48.5 | | | 50.0 | 37.5 | | 12.5 | | |
| B3 | 48.5 | | | 50.0 | 43.8 | | 6.3 | | |
| B4* | 48.5 | | | 50.0 | 50.0 | | | | |
| B5 | 43.7 | 4.9 | | 50.0 | 37.5 | | 12.5 | | |
| B6 | 43.7 | 4.9 | | 50.0 | 43.8 | | 6.3 | | |
| B7 | 43.7 | 4.9 | | 50.0 | 46.9 | | 3.1 | | |
| B8 | 48.5 | | 50.0 | | 37.5 | | 12.5 | | |
| B9 | 48.5 | | | 50.0 | | 37.5 | 12.5 | | |
| B10 | 48.5 | | | 50.0 | 37.5 | | | 12.5 | |
| B11 | 48.5 | | | 50.0 | | | 12.5 | | 37.5 |
| B12 | 48.5 | | | 50.0 | 37.5 | | 12.5 | | |
| B13 | 48.5 | | | 50.0 | | | 18.8 | | 31.3 |

| Sample | 1,4 Butandiol/g | EG/g | PG/g | Na-Acetate/g | Θ | Ω | M$_w$/g*mol$^{-1}$ | M$_n$/g*mol$^{-1}$ |
|---|---|---|---|---|---|---|---|---|
| B1 | | 125.0 | | 0.3 | 0.8 | 1.5 | 17311 | 8073 |
| B2 | | 125.0 | | 0.3 | 0.4 | 1.5 | 28398 | 12019 |

TABLE 1-continued

|     |      |      |     |     |     |       |       |
| --- | ---- | ---- | --- | --- | --- | ----- | ----- |
| B3  |      | 125.0 |     | 0.3 | 0.2 | 1.5 | 35318 | 16430 |
| B4* |      | 125.0 |     | 0.3 | 0.0 | 1.5 | 39852 | 18412 |
| B5  |      | 125.0 |     | 0.3 | 0.4 | 1.5 | 27623 | 11793 |
| B6  |      | 125.0 |     | 0.3 | 0.2 | 1.5 | 36165 | 15054 |
| B7  |      | 125.0 |     | 0.3 | 0.1 | 1.5 | 24979 | 10948 |
| B8  |      | 125.0 |     | 0.3 | 0.4 | 1.5 | 27986 | 13604 |
| B9  |      | 125.0 |     | 0.3 | 0.4 | 1.5 | 26281 | 11626 |
| B10 |      | 125.0 |     | 0.3 | 0.4 | 1.5 | 38476 | 17954 |
| B11 |      | 37.5  |     | 0.3 | 0.4 | 1.5 | 32345 | 11953 |
| B12 | 29.3 |      | 24.7 | 0.3 | 0.4 | 1.5 | 29894 | 13465 |
| B13 |      | 37.5  |     | 0.3 | 0.6 | 1.5 | 25310 | 10501 |

*B4 Comparative sample → no endcap was used for the synthesis of this polymer
DMT = Dimethyl terephthalate
DMI = Dimethyl isophthalate
Poly-THF 1000 = Poly-THF-diol (average molecular weight ($M_n$) = 1 KDa)
Poly-THF 2000 = Poly-THF-diol (average molecular weight ($M_n$) = 2 KDa)
PEG 1000 = Poly(ethyleneglycol)-diol (average molecular weight ($M_n$) = 1 KDa)
PR 1000 = Poly(ethylenglycol)-co-poly(propylenglycol)-diol (average molecular weight ($M_n$) = 1 KDa)
MPEG 750 = Mono methoxylated poly(ethyleneglycol)-monool (average molecular weight ($M_n$) = 0.75 KDa)
M41 = Mono methoxylated poly(ethylenglycol)-co-poly(propylen-glycol)-monool (average molecular weight ($M_n$) = 2000 KDa)
EG = Ethylene glycol
PG = Propylene glycol Component c: C1:
Cobalt stearate solid form (9.5% Elemental cobalt concentration).
Component d: D1:
Surfactant
Masterbatches MB1 to MB10
The components were homogenized together on a Leistritz® ZSE18HP extruder at the temperature of 260° C. to obtain solid masterbatches MB; Table 2 gives the details.

TABLE 2

| Masterbatches | Components used [parts] | | | | | | | | | | | | |
| --- | --- | --- | --- | --- | --- | --- | --- | --- | --- | --- | --- | --- | --- |
| | A1 | A2 | B1 | B4 | B5 | B8 | B9 | B10 | B11 | B12 | B13 | C1 | D1 |
| MB1 | 83 | | 17 | | | | | | | | | | |
| MB2 (Compound) | 97.8 | 2.2 | | | | | | | | | | | |
| MB3 | 90 | | | 10 | | | | | | | | | |
| MB4 | 90 | | | | 10 | | | | | | | | |
| MB5 | 90 | | | | | 10 | | | | | | | |
| MB6 | 90 | | | | | | 10 | | | | | | |
| MB7 | 90 | | | | | | | 10 | | | | | |
| MB8 | 90 | | | | | | | | 10 | | | | |
| MB9 | 90 | | | | | | | | | | 10 | | |
| MB10 | | 86 | | | | | | | | | | 6 | 8 |

Preparation of Cast Films:

As an example of operational mode, 200 μm cast films were obtained via extrusion by using the Colling E 25 PK by inserting the component A1, pre-dried for 18 hours at 120° C., into the main hopper of the machine, and by adding the other components (MB and/or pure additives directly dosed) through dosing units applied to the main stream of component A1 before entering the injection unit barrel. Extruder temperatures can be kept at 260° C. and flat die temperature is 270° C.

The operating conditions during the test were: T1=60° C./T2=240° C./T3=260° C./T4=260° C./T5=260° C./T$_{die}$=270° C./T$_{calender}$rollers=70° C./screw revolutions 80 rpm

TABLE 3

| ex-cpex | Type of material | Composition (%) |
| --- | --- | --- |
| cpex1 | | 100 PET |
| cpex2 | MB | 86.3 PET + 12 MB1 + 1.7 MB10 |

TABLE 3-continued

| ex-cpex | Type of material | Composition (%) |
| --- | --- | --- |
| ex2 | CO | 7.3 PET + 91 MB2 + |
| ex3 | D | 96.3 PET + 2 B1 + |
| ex4 | D | 2 B2 + |
| ex5 | D | 2 B3 + |
| cpex6 | D | 2 B4 + |

TABLE 3-continued

| ex-cpex | Type of material | Composition (%) |
| --- | --- | --- |
| ex7 | MB | 78.3 PET + 20 MB3 + |
| ex8 | MB | 20 MB4 + |
| ex9 | MB | 20 MB5 + |
| ex10 | MB | 20 MB6 + |
| ex11 | MB | 20 MB7 + |
| ex12 | MB | 20 MB8 + |
| ex13 | MB | 20 MB9 + |

The oxygen scavenging activity (in ml $O_2$ consumed per gram of scavenging composition) corresponding to the cast films was measured by the methods described above. Table 4 reports the oxygen consumption of compositions with different copolymer structures and different amount of end caps.

TABLE 4

| Θ Sample Day | 0.0 cpex6 | 0.2 ex5 | 0.4 ex4 | 0.8 ex3 | 0.4 ex11 | 0.6 ex13 |
|---|---|---|---|---|---|---|
| 0 | 0.0 | 0.0 | 0.0 | 0.0 | 0.0 | 0.0 |
| 2 | 6.2 | 6.2 | 4.7 | 2.0 | | |
| 3 | | | | | 0.8 | 0.6 |
| 6 | 24.0 | 20.8 | 17.9 | 6.4 | | |
| 7 | 29.1 | 24.8 | 21.8 | 7.8 | 4.5 | 3.1 |
| 9 | 37.5 | 32.1 | 27.4 | 9.2 | | |
| 10 | | | | | 13.0 | 6.5 |
| 12 | 44.7 | 42.2 | 36.0 | 11.8 | | |
| 14 | 52.0 | 50.6 | 42.2 | 14.8 | 28.2 | 13.2 |
| 17 | | | | | 39.4 | 19.7 |
| 19 | 68.3 | 64.4 | 55.6 | 23.0 | | |
| 21 | 71.9 | 70.5 | 60.1 | 27.2 | 50.7 | 26.4 |
| 23 | 76.8 | 70.5 | 64.5 | 31.4 | | |
| 26 | 82.2 | 76.5 | 68.1 | 36.9 | | |
| 28 | 91.8 | 78.8 | 71.6 | 40.9 | | |

By comparison between ex3 to ex5 and cpex6 a significant dependence of the oxygen consumption rate with respect to the amount of end-caps present is observed. In general, the amount of consumed oxygen decreases when a higher amount of end-caps are introduced. The oxygen consumption rate is strongly dependent on the quantity of end-caps contained into the polyester-copolyether, so one can fine-tune and control the amount of oxygen being scavenged by increasing or reducing the amount of end-caps.

This effect is observed when polyester-copolyether additives are dosed together with the resin directly into the hooper of the extruder as well as when a MB is prepared.

Ex11 and ex13 which refer to end-cap polyesters which are different from those in ex3 to ex5 and cpex6, show exactly the same behavior: higher amounts of end-caps reflect a reduction in oxygen consumption.

Comparison of Powder and Masterbatch Performances 1 g of product comprising 97.7 wt.-% of polyether-polyester copolymer B2 and 2.3 wt.-% of cobalt stearate catalyst (Powder sample) was placed in a glass cup. The glass cup was placed in an aluminum bag together with 4 g of molecular sieve. The bag was heat sealed and 2 L of air were introduced using a syringe.

In a second experiment, 1 g of product comprising 59.85 wt.-% of HDPE (thermoplastic polymer), 40 wt.-% of polyether-polyester copolymer B2 and 0.15 wt.-% of cobalt stearate catalyst (Masterbatch sample) was placed in a glass cup. The glass cup was placed in an aluminum bag together with 4 g of molecular sieve. The bag was heat sealed and 2 L of air were introduced using a syringe.

As comparative examples with state of the art oxygen scavenging materials, 1 g samples of "Pharmakeep® CH" and "Pharmakeep® CD" (both available from (Clariant Healthcare Packaging (France)) were similarly prepared.

The bags were stored at 25° C. and 0% relative humidity. Oxygen measurements were carried out every week for a total of 7 weeks using a CheckMate 3 O2 (Zr) oxygen sensor.

FIG. 1A shows the change of the relative oxygen concentration (y-axis; in %) over time (x-axis; in days) for the samples Powder (diamonds), Masterbatch (triangles), Pharmakeep® CH (squares) and Pharmakeep® CD (circles).

Figure 1B:
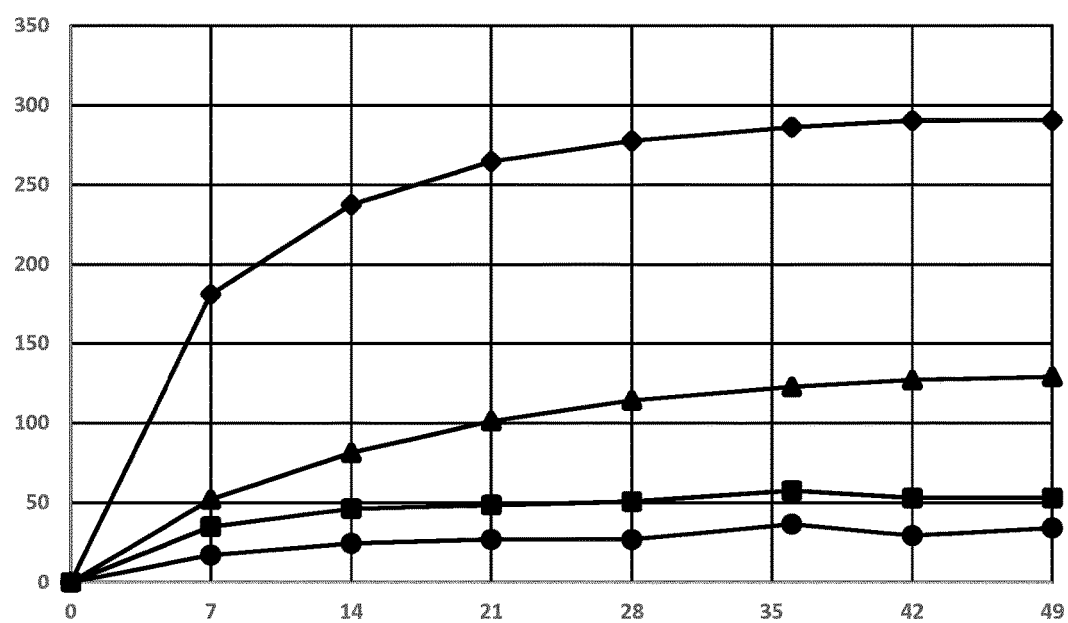
FIG. 1B shows the change of the oxygen adsorption capacity (y-axis; in ml oxygen per g of sample (excluding the desiccant)) over time (x-axis; in days) for tested samples.

FIG. 1B shows the change of the oxygen adsorption capacity (y-axis; in ml oxygen per g of sample (excluding the desiccant)) over time (x-axis; in days) for the samples Powder (diamonds), Masterbatch (triangles), Pharmakeep® CH (squares) and Pharmakeep® CD (circles). The oxygen adsorption capacity K was calculated using the following formula $$K = \frac{V_{init}^{total}}{m_{scav}} \left[ \frac{x_{init}^{O_2} - x_{fin}^{O_2}}{(1 - x_{fin}^{O_2})} \right]$$

in which
$V_{init\ total}$=initial total volume (ml)
$m_{scav}$=initial weight of oxygen scavenger sample (g)
$xO2_{init}$=initial concentration of oxygen (%)
$xO2_{fin}$=final concentration of oxygen (%)

As can be seen, when comparing the Powder and Masterbatch samples, the absorption capacity of the Masterbatch sample is proportional to the amount of polyether-polyester polymer used to produce the masterbatch sample. Both the Masterbatch and Powder samples exhibit clearly higher oxygen absorption capacities than the prior art samples.

Temperature and Relative Humidity Influence

To test the influence of environment temperature and relative humidity, the above described experiments for the 4 different materials were repeated for 0% relative humidity at temperatures of 5, 25, and 40° C., respectively. The results are shown in FIG. 2A.

Figure 2A:
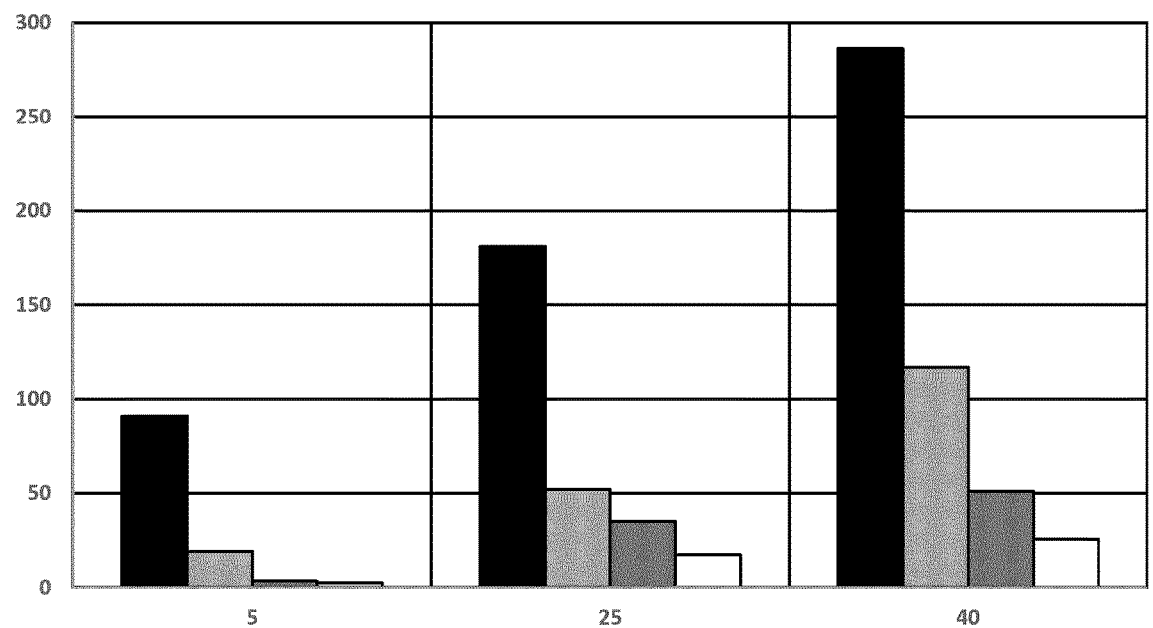
FIGS. 2A and 2B shows results of experiments to test the influence of environment temperature and relative humidity.
Figure 2B:
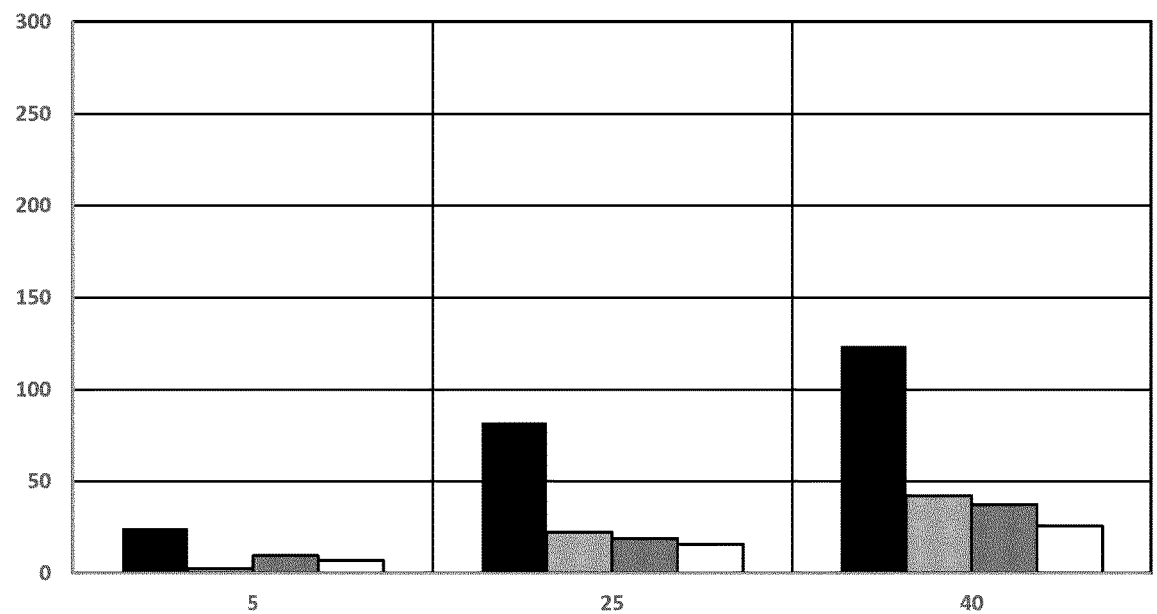

FIG. 2B shows the results for the experiments at 75% relative humidity. To maintain this relative humidity level, instead of molecular sieve a saturated sodium chloride solution was placed inside the bags.

In both FIGS. 2A and 2B, the columns show (from left to right) the samples Powder, Masterbatch, Pharmakeep® CH, and Pharmakeep® CD. The y-axis shows the oxygen absorption capacity in ml oxygen per g of sample; the x-axis shows the temperature in ° C.

The absorption capacity of Powder or Masterbatch depends on the temperature and humidity of the environment and follows the same trends. Thus, absorption capacity of Powder and Masterbatch increases with temperature and decreases with humidity.

Particle Size Influence

To test the influence of the particle size, a Powder sample (97.7 wt.-% polyether-polyester copolymer B10 and 2.3 wt.-% cobalt stearate catalyst) was milled to achieve powder samples with particle sizes ("mass median diameter" $D_{50}$) of 100, 800, and 1600 µm, respectively. The powder samples can for example be miled by cryogenic grinding, optionally followed by sieving. 1 g of powder sample was placed in a glass cup. The glass cup was placed in an aluminum bag together with 4 g of molecular sieve. The bag was heat sealed and 2 L of air were introduced using a syringe.

The bags were stored at 25° C. and 0% relative humidity. Oxygen measurements were carried out as described above every week for a total of 7 weeks.

Figure 3:
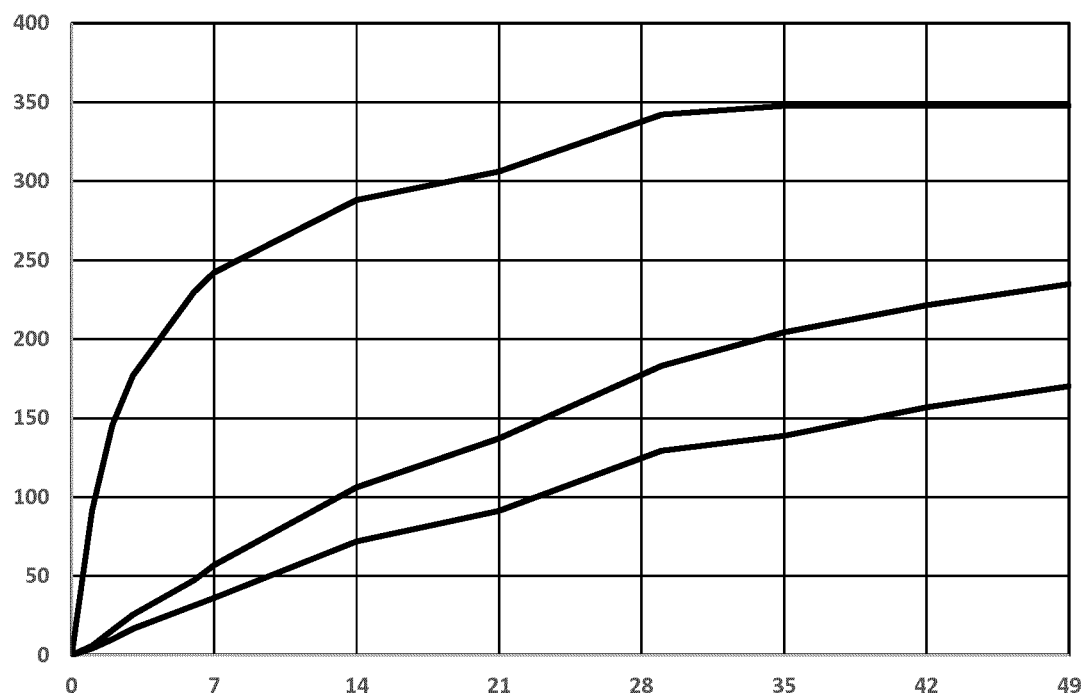
FIG. 3 shows the influence of the particle size on the oxygen adsorption capacity (y-axis; in ml oxygen per g of sample) over time (x-axis; in days) for tested samples.

FIG. 3 shows the influence of the particle size on the oxygen adsorption capacity (y-axis; in ml oxygen per g of sample) over time (x-axis; in days) for the samples with 100 µm (top), 800 µm (center) and 1600 µm particle size (bottom).

As can be seen, the absorption capacity of the powder samples depends on the particle size distribution. Thus, absorption capacity of powder increases with decreasing particle size.

Amount of Catalyst Influence

Oxygen absorption capacity was determined for different polyether-polyester copolymers which were mixed with different amounts of cobalt stearate catalyst (0.6, 1, 2.3, and 3 wt.-% relative to the amount of polyether-polyester copolymer). The general experimental setup was as described above in connection with the test that gave the results in FIG. 1B. The results for measurements carried out after one week storage in a 2 L air-filled aluminum bag at 25° C. and 0% relative humidity are summarized in Table 5.

TABLE 5

| Copolymer | Cobalt stearate [wt.-% w.r.t. Copolymer plus catalyst] | Oxygen absorption capacity [ml $O_2$/g] |
|---|---|---|
| B2 | 0.6 | 96.8 |
| B2 | 1 | 119.2 |
| B2 | 2.3 | 204.1 |
| B2 | 3 | 129.7 |
| B10 | 0.6 | 88.5 |
| B10 | 1 | 119.4 |
| B10 | 2.3 | 193.4 |
| B10 | 3 | 124.0 |

According to the results, minimal amount of catalyst keeping a good an interesting level of absorption capacity and kinetic have been established at appr. 2.3 wt.-% relative to the weight of polyether polyester copolymer plus transition metal catalyst. Higher concentration of catalyst does not provide better capacity or kinetics.

Performance Testing of Polymer Composition 1 g of sample (according to Table 6=according to the invention; as a comparative example 1 g of Pharmakeep CD was used) was placed in a glass cup. The glass cup was placed in an aluminum bag. The bag was heat sealed and 200 ml of air were introduced using a syringe. Then, the hole through which the air had been injected was closed by heat sealing.

TABLE 6

| Sample No. | Polyether-polyester copolymer 29.3 wt.-% | Catalyst 0.7 wt.-% | Desiccant 70 wt.-% |
|---|---|---|---|
| 1 | B2 | Cobalt stearate | Silica gel |
| 2 | B2 | Cobalt stearate | Molecular sieve |
| 3 | B10 | Cobalt stearate | Silica gel |
| 4 | B10 | Cobalt stearate | Molecular sieve |

The bags were stored at 25° C. Oxygen measurements were carried out as described above every week for a total of 5 weeks.

Figure 4A:
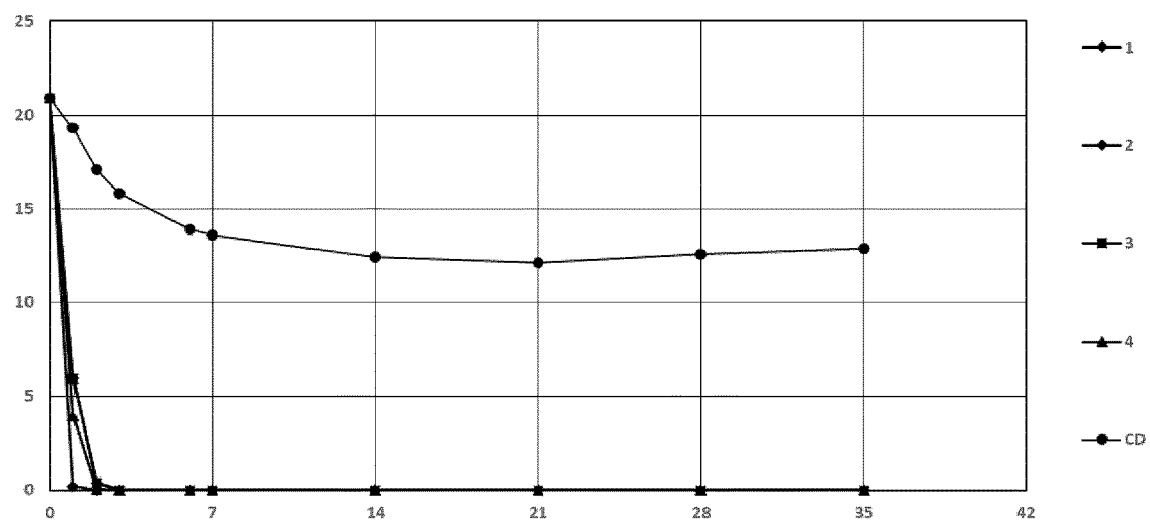
FIG. 4A shows the change of the relative oxygen concentration (y-axis; in %) over time (x-axis; in days) for tested samples and a comparative example.

FIG. 4A shows the change of the relative oxygen concentration (y-axis; in %) over time (x-axis; in days) for the samples 1-4 and the Pharmakeep® CD (comparative example).

In parallel, relative humidity inside the bags was measured. The results are shown in FIG. 4B (y-axis=relative humidity in %; x-axis=time in days).

Figure 4B:
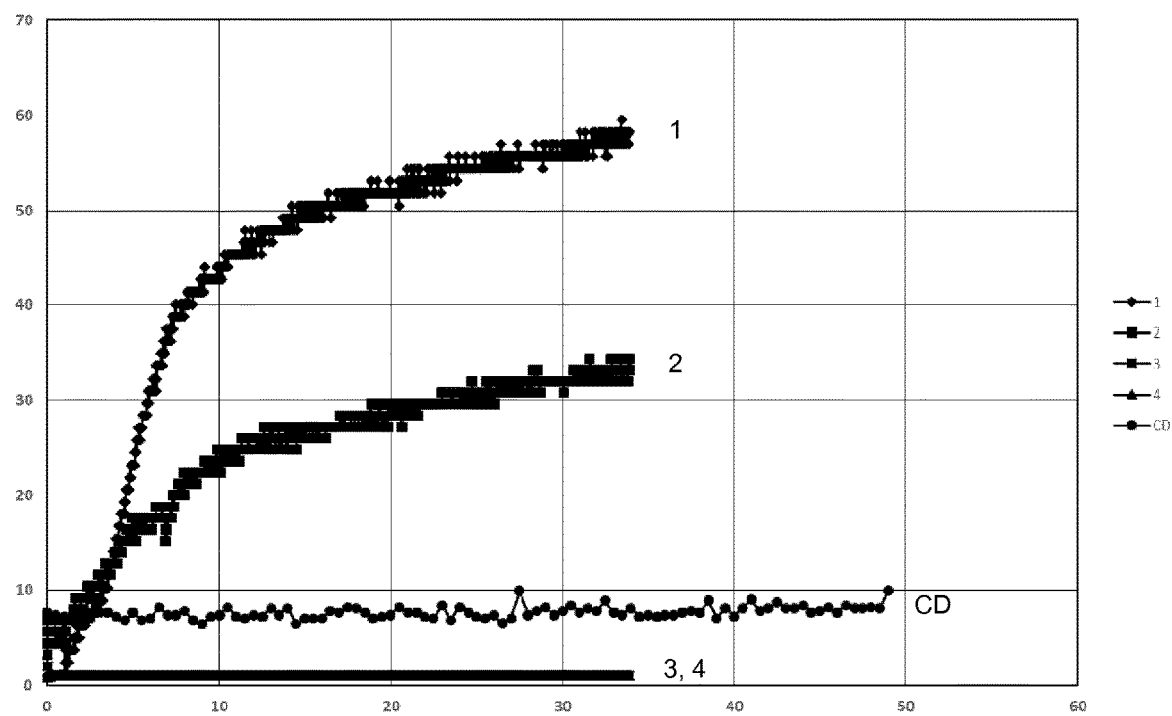
FIG. 4B shows the change of the relative humidity (y-axis; in %) over time (x-axis; in days) for tested samples and a comparative example.

The results shown in FIGS. 4A and 4B show that samples 1-4 (according to the invention) are able to absorb the entire oxygen in a 200 ml headspace volume. Samples 2 and 4 (using molecular sieve as the desiccant in the polymer composition of the invention) in addition are able to maintain a low (close to zero) relative humidity inside the sample bag.

As has been demonstrated and described above, the present invention provides a polymer composition which is in particular useful for medical/pharmaceutical applications, and is in particular useful at low relative humidity and is insensitive or neutral to the humidity of the environment.

As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

The invention claimed is:

1. A polymer composition, comprising:
   a polyether-polyester copolymer in a form of a powder having a mass median diameter $D_{50}$ of less than 1000 µm,
   a transition metal catalyst, and
   a desiccant comprising one or more of a silica gel, a zeolite, a desiccant clay, an activated carbon, an alkali metal salt, an alkaline earth metal salt, and mixtures thereof in an amount of 0.1 wt.-% or more,
   wherein the polyether-polyester copolymer comprises:
   polyether segments wherein at least one polyether segment contains at least one polytetramethylene oxide segment;
   (ii) polyester segments;
   (iii) bridging elements of the structure —CO—R2-CO—, wherein R2 represents an optionally substituted bivalent hydrocarbon residue consisting of 1 to 100 carbon atoms; and
   (iv) one or two end-caps having a formula selected from:

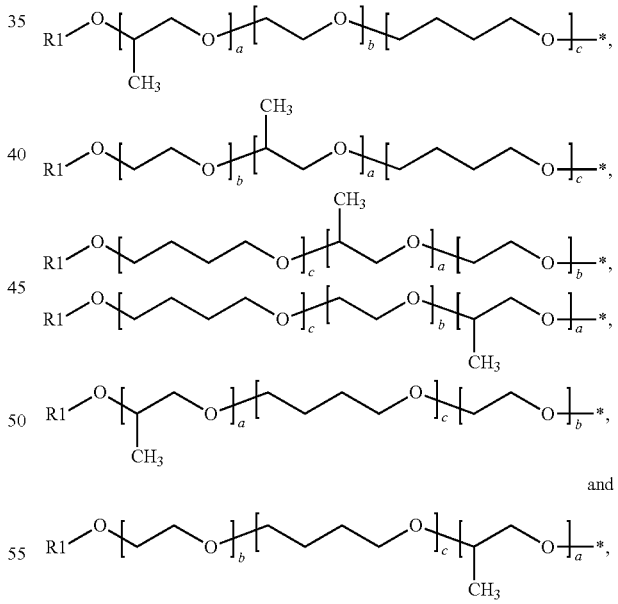

wherein the different monomers are distributed randomly, in blocks, or in a combination of random and block, and
R1 is an optionally substituted aliphatic hydrocarbon residue of 1 to 24 carbon atoms, an optionally substituted olefinic hydrocarbon residue of 2 to 24 carbon atoms, or an optionally substituted aromatic hydrocarbon residue of 6 to 14 carbon atoms;
said hydrocarbon residues are optionally substituted with one or more groups independently selected from the group consisting of $C_1$-$C_5$-alkoxy, nitro, cyano, sulfo, and combinations thereof;

b is an integer between 1 and 250;

a is an integer between 1 and 250; and c is an integer between 1 and 70.

2. The polymer composition of claim 1, wherein the polyether segments (i) further comprise ethylene oxide segments, propylene oxide segments or a combination thereof.

3. The polymer composition of claim 1, wherein the polyester segments (ii) are represented by formula (II):

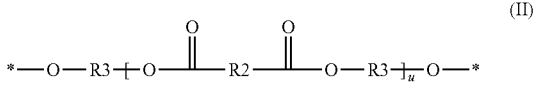

wherein
* represents a bond to a bridging element (iii),
R2 and R3 independently of each other represent an optionally substituted hydrocarbon residue consisting of 1 to 100 carbon atoms, and
u is an integer between 1 and 50;
wherein said hydrocarbon residues are optionally substituted with one or more groups independently selected from the group consisting of $C_{1-5}$-alkoxy, nitro, cyano, sulfo, and combinations thereof.

4. The polymer composition of claim 1, wherein bridging elements are described by formula (III)

wherein R2 represents an optionally substituted hydrocarbon residue consisting of 1 to 100 carbon atoms, and said hydrocarbon residue is optionally substituted with one or more groups independently selected from the group consisting of $C_{1-5}$-alkoxy, nitro, cyano, sulfo, and combinations thereof.

5. The polymer composition of claim 1, wherein R1 denotes methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, sec-hexyl, n-heptyl, n-octyl, 2-ethyl-hexyl, n-nonyl, n-decyl, tridecyl, isotridecyl, tetradecyl, hexadecyl, octadecyl, methylphenyl cyclopropyl, cyclobutyl, cyclopentyl, cyclohexyl, cycloheptyl, cyclooctyl, cyclononyl, or cyclodecyl.

6. The polymer composition of claim 1, wherein the polyether-polyester copolymer has a number average of the molecular weight of between 2,000 and 1,000,000 g/mol.

7. The polymer composition of claim 1, wherein the polyether-polyester copolymer has a mass ratio Q defined as the mass ratio between the poly(tetramethyleneoxide) content and the overall content of all dicarbonyl structure elements (ii) and (iii) of between 0.1 and 10.

8. The polymer composition of claim 1, wherein the polyether-polyester copolymer has a mass ratio Θ defined as the mass ratio between the endcap content and the overall content of all dicarbonyl structure elements (ii) and (iii) of between 0.001 and 100.

9. The polymer composition of claim 1, wherein the transition metal catalyst is a salt of a transition metal selected from the $1^{st}$, $2^{nd}$, or $3^{rd}$ transition series of the periodic table of elements.

10. The polymer composition of claim 1, wherein the transition metal catalyst is a salt of iron (II or III), nickel (II or III), manganese (II or III), or cobalt (II or III).

11. The polymer composition of claim 1, wherein the transition metal catalyst is a salt selected from the group consisting of cobalt oleate, cobalt propionate, cobalt stearate, and cobalt neodecanoate.

12. The polymer composition of claim 1, wherein the transition metal catalyst is present in an amount of 0.01 wt.-% to 5 wt.-%, based on the total weight of the polymer composition.

13. The polymer composition of claim 1, wherein the polyether-polyester copolymer is present in amount of 5-50 wt.-%, the transition metal catalyst is present in an amount of 0.01-5 wt.-%, and the desiccant is present in an amount of 0.1-95 wt.-%, based on the total weight of the polymer composition.

14. An active oxygen barrier composition comprising the polymer composition of claim 1.

15. A plastic material comprising:
a thermoplastic polymer; and
the polymer composition of claim 1.

16. A masterbatch comprising the plastic material of claim 15.

17. An article of manufacture comprising the polymer composition of claim 1.

18. The article of manufacture of claim 17, wherein the article of manufacture is a medical or pharmaceutical packaging element.

19. The polymer composition of claim 1, wherein the transition metal catalyst is present in an amount of 0.07 wt.-% to 2.5 wt.-%, based on the total weight of the polymer composition.

20. The polymer composition of claim 1, wherein the desiccant is present in an amount of 40-80 wt.-%.

* * * * *